(12) United States Patent
Clark

(10) Patent No.: US 8,166,796 B2
(45) Date of Patent: May 1, 2012

(54) SYSTEM AND METHOD FOR IMPROVING THE PRECISION OF NANOSCALE FORCE AND DISPLACEMENT MEASUREMENTS

(75) Inventor: Jason Vaughn Clark, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 185 days.

(21) Appl. No.: 12/725,919

(22) Filed: Mar. 17, 2010

(65) Prior Publication Data

US 2010/0192266 A1    Jul. 29, 2010

Related U.S. Application Data

(62) Division of application No. 12/075,503, filed on Mar. 12, 2008, now Pat. No. 7,721,587.

(60) Provisional application No. 60/906,355, filed on Mar. 12, 2007.

(51) Int. Cl.
*G01B 3/30* (2006.01)
(52) U.S. Cl. .......................................... 73/1.79
(58) Field of Classification Search .................... 73/1.79
See application file for complete search history.

(56) References Cited

U.S. PATENT DOCUMENTS

| | | | |
|---|---|---|---|
| 4,825,684 A * | 5/1989 | Nishiguchi et al. ............ 73/1.59 |
| 5,445,006 A | 8/1995 | Allen et al. |
| 5,528,214 A * | 6/1996 | Koga et al. ........................ 338/4 |
| 5,703,754 A | 12/1997 | Hinze |
| 5,866,821 A * | 2/1999 | Raynes ........................... 73/708 |
| 6,189,374 B1 | 2/2001 | Adderton et al. |
| 6,780,664 B1 | 8/2004 | Goruganthu et al. |
| 7,111,504 B2 | 9/2006 | Blumberg et al. |
| 2005/0081363 A1 | 4/2005 | Malshe et al. |
| 2005/0241394 A1 | 11/2005 | Clark |
| 2006/0005602 A1* | 1/2006 | Tsui et al. ....................... 73/1.01 |
| 2007/0044545 A1 | 3/2007 | Beyder et al. |

OTHER PUBLICATIONS

Shapiero, B. (edited by), "Control and System Integration of Micro- and Nano-scale Systems", Report from the National Science Foundation workshop, Mar. 29-30, 2004, 108 pages.
Clark, J.V., "Electo Micro-Metrology", Ph.D. dissertation, Fall 2005, U.C. Berkeley, pp. 11-219.
"MEMS standards, while small, may mean much for the industry", Small Times, Aug. 26, 2003, pp. 1-2.
Green, J. and Krakauer, D., "New iMEMS Angular Rate-Sensing Gyroscope," Analog Dialogue, 37-03, 2003.

* cited by examiner

*Primary Examiner* — Robert R Raevis
(74) *Attorney, Agent, or Firm* — Faegre Baker Daniels LLP

(57) ABSTRACT

A self-calibrating apparatus comprises a primary device and a test structure fabricated on an integrated circuit chip. The primary device and the test structure have at least one unknown property due to a fabrication process of the integrated circuit chip. An electrical measurand sensor is configured to measure an electrical measurand of the test structure. A controller coupled to the primary device and electrical measurand sensor. The controller is configured to calculate the at least one unknown property of the test structure based on the measured electrical measurand and use the calculated at least one unknown property to calibrate the primary device.

20 Claims, 24 Drawing Sheets

SYSTEM AND METHOD FOR IMPROVING THE PRECISION OF NANOSCALE FORCE AND DISPLACEMENT MEASUREMENTS

CROSS REFERENCE TO RELATED APPLICATION

This application is a divisional of U.S. application Ser. No. 12/075,503, filed on Mar. 12, 2008, which claims the benefit of U.S. Provisional Application Ser. No. 60/906,355, filed Mar. 12, 2007, both of which are expressly incorporated by reference herein.

BACKGROUND AND SUMMARY OF THE INVENTION

The following listed references are expressly incorporated by reference herein. Throughout the specification, these references are referred to by citing to the numbers in the brackets [#].

[1] Control and System Integration of Micro- and Nano-scale Systems, Report from the National Science Foundation workshop Mar. 29-30, 2004, edited by Benjamin Shapiro, and available at www.isr.umd.edu/CMN-NSFwkshp/WkshpFullReport.pdf
[2] J. V. Clark, Electro Micro-Metrology, Ph.D. dissertation, Fall 2005, U. C. Berkeley.
[3] J. Marshal of the National Institute of Standards and Technology, 2005, August 2003, www.smalltimes.com/document_display.cfm?document id=6556
[4] J. Green and D. Krakauer, "New iMEMS Angular Rate-Sensing Gyroscope," Analog Dialogue, 37-03, 2003, Analog Devices, Inc., available at www.analog.com/library/analogDialogue/archives/37-03/gyro.html The present invention relates to an apparatus and method for improving the precision of nanoscale force-displacement measurements. Nanotechnology has great potential for being used to create new and improved medicines, materials, sensors, and devices through molecular-scale engineering [1]. The rate of such advancements depends on our ability to understand nanoscale phenomena. Therefore, with increasing interest in nanotechnology to improve the quality of our lives, there has been increasing interest in force-displacement measurements to improve our understanding of nanoscale phenomena.

Large uncertainties exist in conventional measurement tools which cause a bottleneck to technological advancements [1]. For instance, large uncertainties make it difficult to: 1) resolve important subtleties during the research phase; 2) verify or develop predictive models during the design phase; and 3) develop testing standards for the commerce phase. For example, most measurement tools only yield about two significant digits of accuracy. It is often quite difficult to match the mathematical physics of a simulation with an experiment when the experiment has such large relative error. Due to these large uncertainties, the industry has been slow to develop a consensus on the methods or the tools that are used to measure geometric properties, dynamic properties and material properties at the micro and nano-scale.

When engineering such micro and nano-scale systems, adequate computer aided design/engineering tools and metrology tools are needed. Metrology is the science of measurement. Scientists may discover a new nano-scale phenomenon and then try to exploit properties of the discovered phenomenon. The next step is understanding the discovered phenomenon. Scientists do this by developing a theory based on the physics that they understand at the time. Then, scientists try to match the theory with experiment. The next step is to build computer-efficient models of a phenomenon. Parameters are from metrology. The next step is to assemble the models developed into a system level simulation to try to predict the outcome of a new device. Often times, discovery which leads to an invention is made at this step. The next step is realization and finally, verification where metrology is used once again to see how well simulation has predicted reality. Metrology is used throughout this process which indicates its importance.

Two illustrative types of metrology are displacement and force. One of the most important nanoscale tools is the atomic force microscope (AFM), which is used to measure forces on the order of tens of piconewtons (similar to the force necessary to rupture DNA), used as a positioner, and used to measure displacements on the order of tenths of nanometers (similar to the size of atoms). However, precise calibration of the AFM has been difficult (~1-15% precision [2]). The AFM is not sensitive enough to precisely characterize more subtle phenomena such as the van der Waals forces involved in protein folding ($\sim 10^{-12}$N), the quantum vacuum forces involved in the Casimir effect ($\sim 10^{-13}$N), or the Langevin forces involved in Brownian motion of bacterium ($\sim 10^{-14}$N). Currently, subtle nanoscale phenomena are beyond precise verification and characterization, or possibly worse, beyond discovery.

When measuring force, a conventional mass balance can measure forces to a level of about a micro-Newton ($10^{-6}$N), which is illustratively equivalent to solar radiation per m$^2$ near earth. A conventional AFM can measure forces to a level of about a hundredth of a nano-Newton, illustratively the gravitational force between two 1 kg masses 1 m apart ($10^{-11}$N). The improved force sensor of the present invention using the EMM calibration method can measure forces to a level of a pico-Newton, illustratively the light pressure of a 1 mW laser pointer or the forces due to protein folding, or even less in the range of $10^{-13}$N to $10^{-16}$N.

The atomic force microscope or AFM is the most popular nanoscale force detection tools used today. It consists of a cantilever, a very sharp probe tip and a laser beam which reflects off of the end of the cantilever onto a photodiode. Interaction forces between the tip and the target surface cause the cantilever to deflect. That small deflection is amplified by the reflecting laser light onto the photodiode which is used to measure that deflection. Knowing the deflection and knowing the stiffness of the cantilever allows one to measure force. The resolution of force of an AFM is on the order of 10 pico-Newtons. The AFM is also used as a positioner with a resolution of about a nano-meter.

Components of an AFM system include a cantilever, a laser diode, a mirror, a position sensitive photodetector, a feedback loop, piezoelectric scanner to move the sample, and a computer which performs the data acquisition, display and analysis.

There are many ways to calibrate the AFM cantilever. Three of the most popular are the thermal method, the added mass method and the unload resonance technique. There is no calibration standard and most conventional calibration methods yield about 1-15% uncertainty.

The illustrated apparatus and method of the present invention significantly increases the ability of scientists and engineers to sense and actuate at the nanoscale by several orders of magnitude. The present apparatus and method may benefit branches of biology, physics, chemistry, and engineering.

The present calibration system and method uses Electro Micro-Metrology (EMM) techniques, which are substantially more precise and practical than convention. Precise geometric, dynamic, and material properties at the micro/nanoscale can be extracted using electronic measurands. This is based on leveraging the sensitive electrical-mechanical coupling of microsystems to measure and characterize themselves.

In one illustrated embodiment, the present invention provides an on-chip, self-characterization method that differs from conventional metrology methods, which adapt macroscale tools and techniques to the micro/nanoscale, and which do not precisely determine the geometry and material properties due to process variation. EMM has several benefits over conventional methods as follows: 1) EMM does not rely on unconfirmed geometrical and material properties; 2) A multitude of properties can be extracted; 3) Uncertainties are much smaller and well-characterized, i.e. much more than two significant digits are attainable; 4) EMM measurements are performance-based and may lead to micro/nanoscale testing standards; 5) EMM's precision is reliable and repeatable; 6) EMM is nondestructive; 7) EMM is low cost; 8) The apparatus is small, lightweight, and portable; 9) It is automatable and amenable to industrial batch processing; 10) EMM is low-power; 11) EMM can be calibrated after packing, after a harsh environmental change, or after long-term dormancy; 12) The measurements are local; 13) Only a few test structures and a small amount of chip real estate are required; and 14) EMM is easier to use and measurements can be performed more quickly than convention.

Electro Micro Metrology (EMM) methods allow extraction of geometric, dynamic and material properties solely as functions of electrical measurands such as change of capacitance, change in voltage and/or change in frequency.

Geometric properties include:
1. Overetch
2. Sidewall angle
3. Gap spacing
4. Beam length
5. Area
6. Layer thickness
7. Beam width
8. Elongation
9. Comb finger offset
10. Etch hole Dynamic properties illustratively include:
1. Comb drive force
2. Displacement
3. System stiffness
4. Damping factor
5. Natural frequency
6. System mass
7. System damping
8. Velocity resonance
9. Displacement Amplitude
10. Quality factor Material properties illustratively include:
1. Base compliance
2. Webbing stiffness
3. Beam stiffness
4. System modulus
5. Shear modulus
6. Poisson's ratio
7. Strain
8. Stress
9. Material density
10. Material Young's Modulus In an illustrated embodiment of the present invention, a method is provided for improving precision of a nano-scale sensor. The method comprises fabricating a sensor on an integrated circuit chip, the sensor having at least one unknown property due to a fabrication process, determining the at least one unknown property of the sensor as a function of at least one electrical measurand associated with the sensor, precisely measuring the electrical measurand associated with the sensor, calculating the at least one unknown property of the sensor based upon the precisely measured electrical measurand, and using the at least one calculated property of the sensor to improve precision of the sensor.

In another illustrated embodiment of the present invention, a self-calibrating apparatus comprises a primary device fabricated on an integrated circuit chip. The primary device has at least one unknown property due to a fabrication process of the integrated circuit chip. The apparatus also comprises a test structure fabricated on the same integrated circuit chip as the primary device. The test structure has the same material properties as the primary device so that the test structure also has the same at least one unknown property as the primary device. The apparatus further comprises a electrical measurand sensor configured to measure an electrical measurand of the test structure, and a controller coupled to the primary device and electrical measurand sensor. The controller includes means for calculating the at least one unknown property of the test structure based on the measured electrical measurand. The controller uses the calculated at least one unknown property to calibrate the primary device.

In an exemplary embodiment, the electrical measurand sensor is fabricated on the same chip as the primary device and the test structure. The controller may also fabricated on the same chip as the primary device, the test structure, and the electrical measurand sensor. Illustratively, the at least one unknown property may comprises at least one of Young's modulus, density, stress, stain gradient, a geometrical error, viscosity, and stiffness.

In yet another illustrated embodiment of the present invention, an atomic force microscope having three degrees of freedom of movement comprises first and second anchors rigidly coupled to a substrate, first and second flexures coupled to the first and second anchors, respectively, a first plate coupled to the first flexure, a first drive actuator coupled to the first plate, and an electrode coupled to the first plate. The atomic force microscope further comprises a second plate coupled to the first plate by a third flexure, a third plate coupled to the first plate by at least one structures, the third plate also being coupled to the second anchor by the second flexure, a second drive actuator located between the second and third plates, and a probe tip coupled to the second plate. The first and second flexures and the first drive actuator provide a first degree of freedom, the electrode provides a second degree of freedom, and the third flexure and the second drive actuator provide a third degree of freedom.

The above-mentioned and other features of this invention, and the manner of attaining them, will become more apparent and the invention itself will be better understood by reference to the following description of illustrated embodiments of the invention taken in conjunction with the accompanying drawings.

DETAILED DESCRIPTION OF THE DRAWINGS

Figure 1:
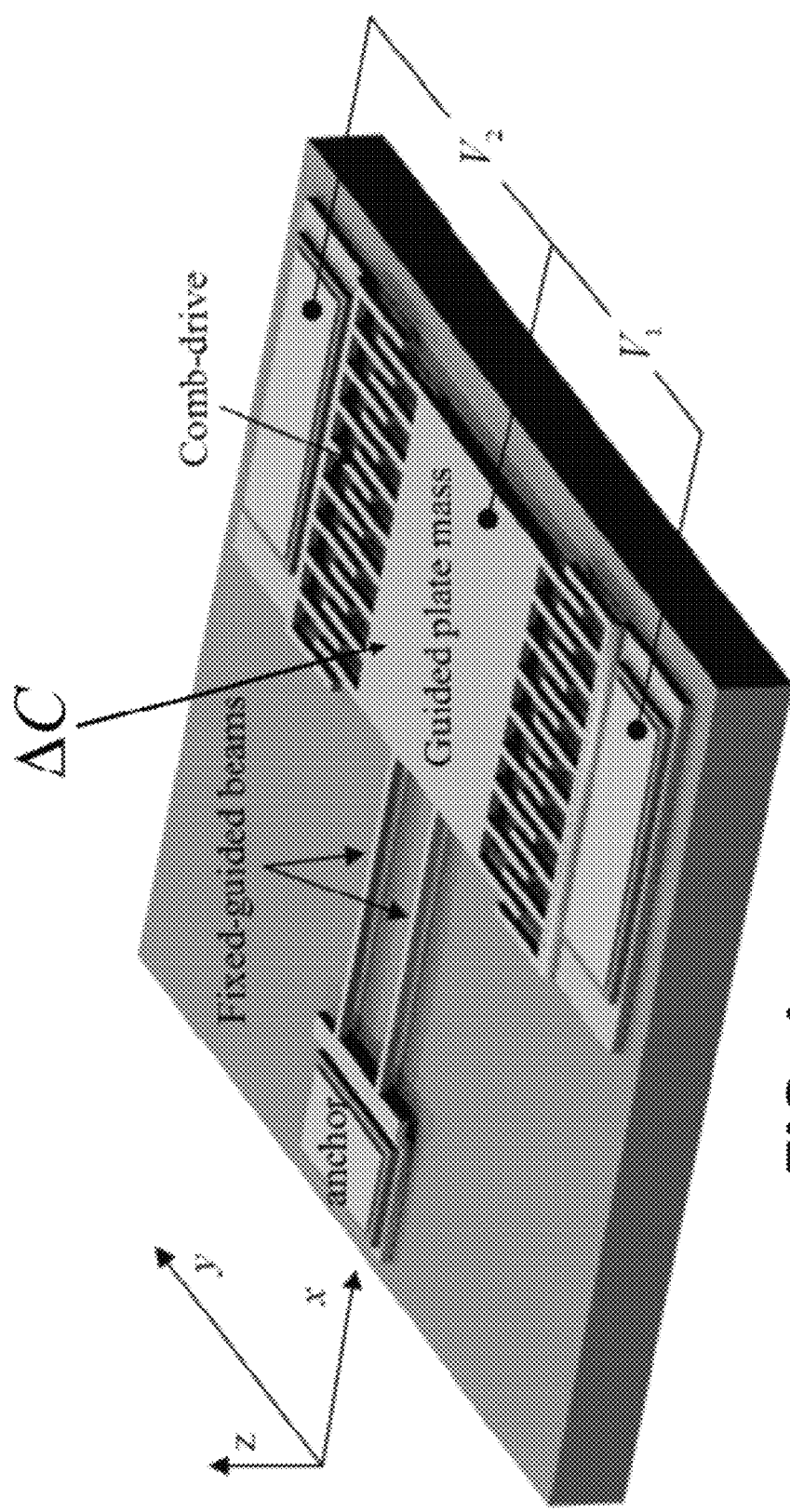
FIG. 1 is an illustrative test structure for electro micro metrology (EMM)

For the purposes of promoting an understanding of the principles of the invention, reference will now be made to certain illustrated embodiments and specific language will be used to describe the same. It will nevertheless be understood that no limitation of the scope of the invention is thereby intended. Such alterations and further modifications of the invention, and such further applications of the principles of the invention as described herein as would normally occur to one skilled in the art to which the invention pertains, are contemplated, and desired to be protected.

The illustrated apparatus and method of the present invention uses EMM to alleviate some of the metrology and modeling bottlenecks in nano-scale science and technology discussed above. Determining the fundamental properties of microdevices has been a longstanding problem at the micro/nano-scale. Properties vary from lab to lab, from run to run at the same lab, and from chip to chip across a single wafer.

To date, there are no nano-scale ASTM standards, and only two micro-scale ASTM standards: one for measuring cantilever length; and another for measuring cantilever strain gradient [3]. There has been no consensus on methods to measure other properties—mostly due to the large uncertainties in the measurement techniques. In essence, the present system and method involves determining what geometric and material properties of an effective model are required to match the performance of the true device. These effective properties of the model are assumed to be the effective properties of the true device. This concept is exemplified in FIGS. 4 and 5, where a true cantilever is shown next to its ideal counterpart. Full details of this theory are given in [2].

Electro Micro Metrology (EMM) exploits the strong and sensitive electromechanical coupling to extract mechanical properties X as functions of electronic measurands e. The property x can be a geometric, dynamic, or material property. The electronic measurand Δe can be a change in capacitance, voltage, or frequency. From the Taylor expansion of analytical models, measurement has the mathematical form $$X(\Delta e \pm \delta e) = X(\Delta e) \pm \left[\frac{\partial X}{\partial \Delta e}\right]\delta e \quad (1)$$

where δe is the uncertainty in the electronic measurand. That is, δe is the decimal place of the last flickering digit on the capacitance meter, which is the accumulation of all noise or the correlated noise floor (i.e. impinging air molecules, modulating electric fields, Brownian noise, etc.). The coefficient (∂X/∂Δe) in (1) is the sensitivity between the mechanics and the electronics. This coefficient is what coverts the electronic uncertainty to a mechanical uncertainty. That is, the product (∂X/∂Δe)δe is the uncertainty in mechanical measurement, δX, which is at once measurable and well-defined. In contrast, most micro/nanotechnologists have difficulty determining uncertainty, which leads to coarse approximations. Preliminary analysis shows that the sensitivity (∂X/∂Δe) can be quite large—as high as $O(10^8)$. It is therefore necessary that the factor δe be much smaller. Fortunately, δe can be made to be much, much smaller—as small as $O(10^{-21})$. Using Analog Devices' result as a corroborating example, since the capacitance resolution δe=δC of their iMEMS gyro was on the order of a zeptofarad, and their displacement δX=δy was on the order of 100 femtometers, then their sensitivity is clearly $[\partial y/\partial \delta C]=10^8$. Worse case scenario, if Analog Devices' correlated noise floor was a thousand times greater, i.e. δC=attofarad, then their uncertainty in displacement would have been on the order of an Angstrom (the size of an atom), which is still respectable.

FIG. 1 illustrates a conventional EMM test structure. The test structure may be used in the examples that follow. The illustrated test structure includes comb drives, fixed guided beams which guide a plate mass, and an anchor at the opposite end of the fixed-guided beams. Once fabricated, the geometry material properties of test structure need to be determined.

Figure 2:
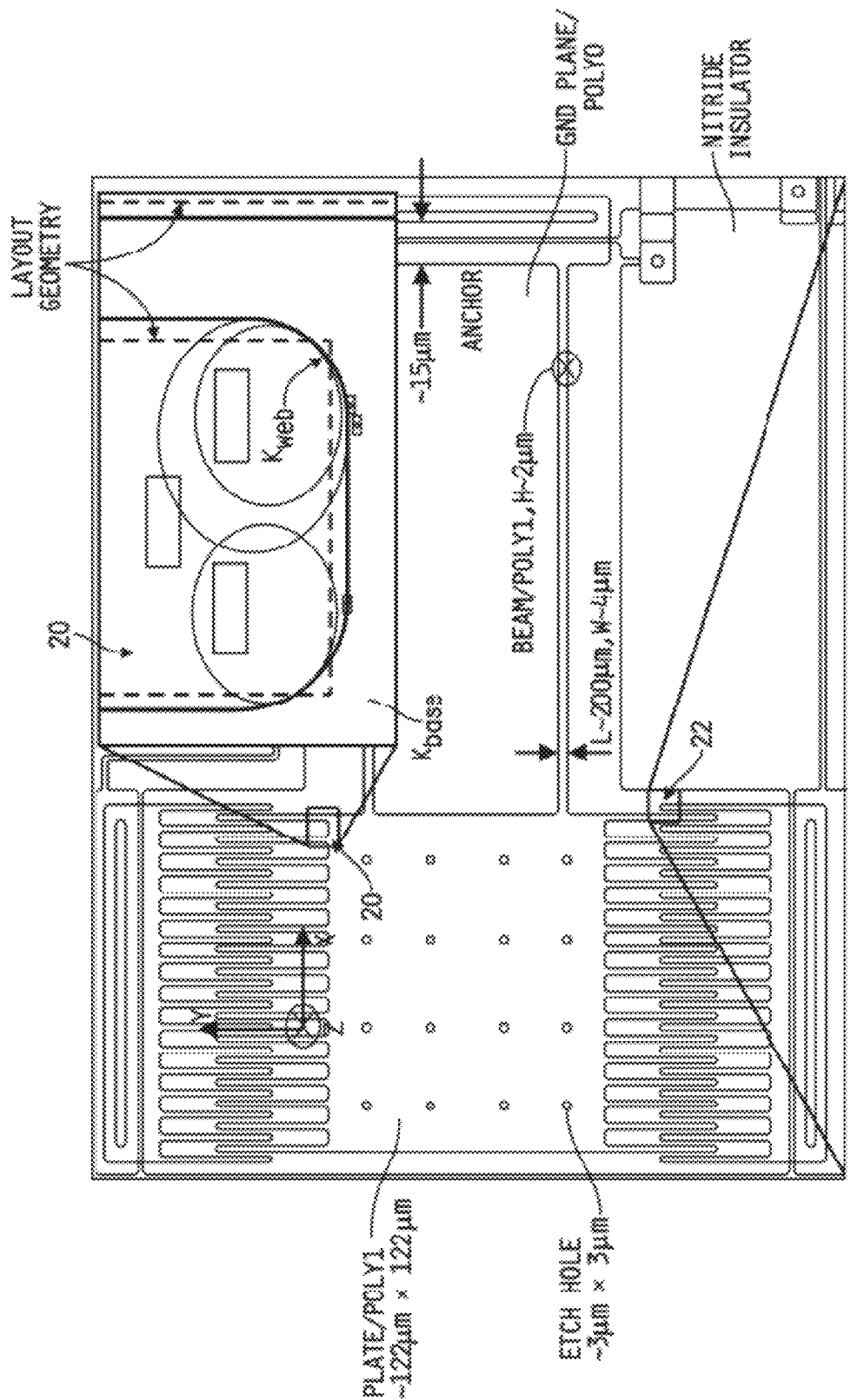
FIG. 2 is a fabricated version of the test structure of FIG. 1 with an enlarged portion to show a comparison between layout geometry and fabrication geometry.
Figure 3:
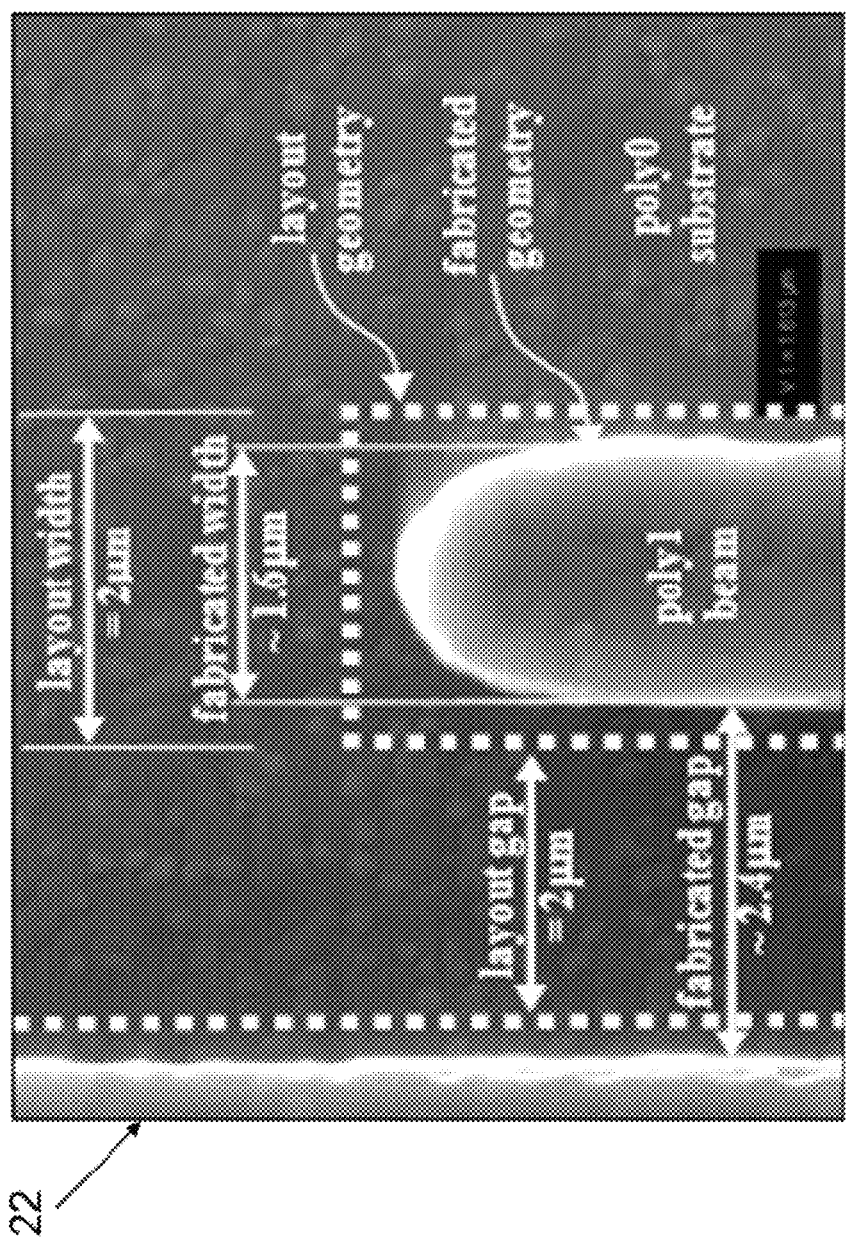
FIG. 3 is an enlarged view of another portion of the fabricated version of the test structure of FIG. 2.

FIG. 2 illustrates a fabricated version of the test structure of FIG. 1. The upper rectangle shows a magnified view of a comb finger in region 20 as it is attached to the plate. The dashed lines of the layout geometry shown not to match the actual fabricated geometry. FIG. 3 illustrates a magnified view of the tip of a finger of region 22 of FIG. 2. A close up of the gap in the tip of the comb finger are shown. Layout geometry is again shown as dashed lines. The gaps are larger and the widths of the fingers are smaller. This implies that both the capacitance and the stiffness are smaller then would have been predicted using only layout geometry. The difference in width of the support beams and electrostatic gaps significantly affect the ability to predict performance before the device is fabricated. It is also difficult to numerically match performance after the device is fabricated because conventional metrology techniques yield large uncertainties.

Beams are attached to anchors and plates both of which are not rigid. There is an area of compliance which in effect causes an additional rotation upon the deflection of a beam. The radius of compliance is that radius that beyond which produces no significant additional increase in that rotation. The problems caused by compliant plates and anchors and fillets can be alleviated by allowing the beams to flare out as it approach these interfaces.

Figure 4:
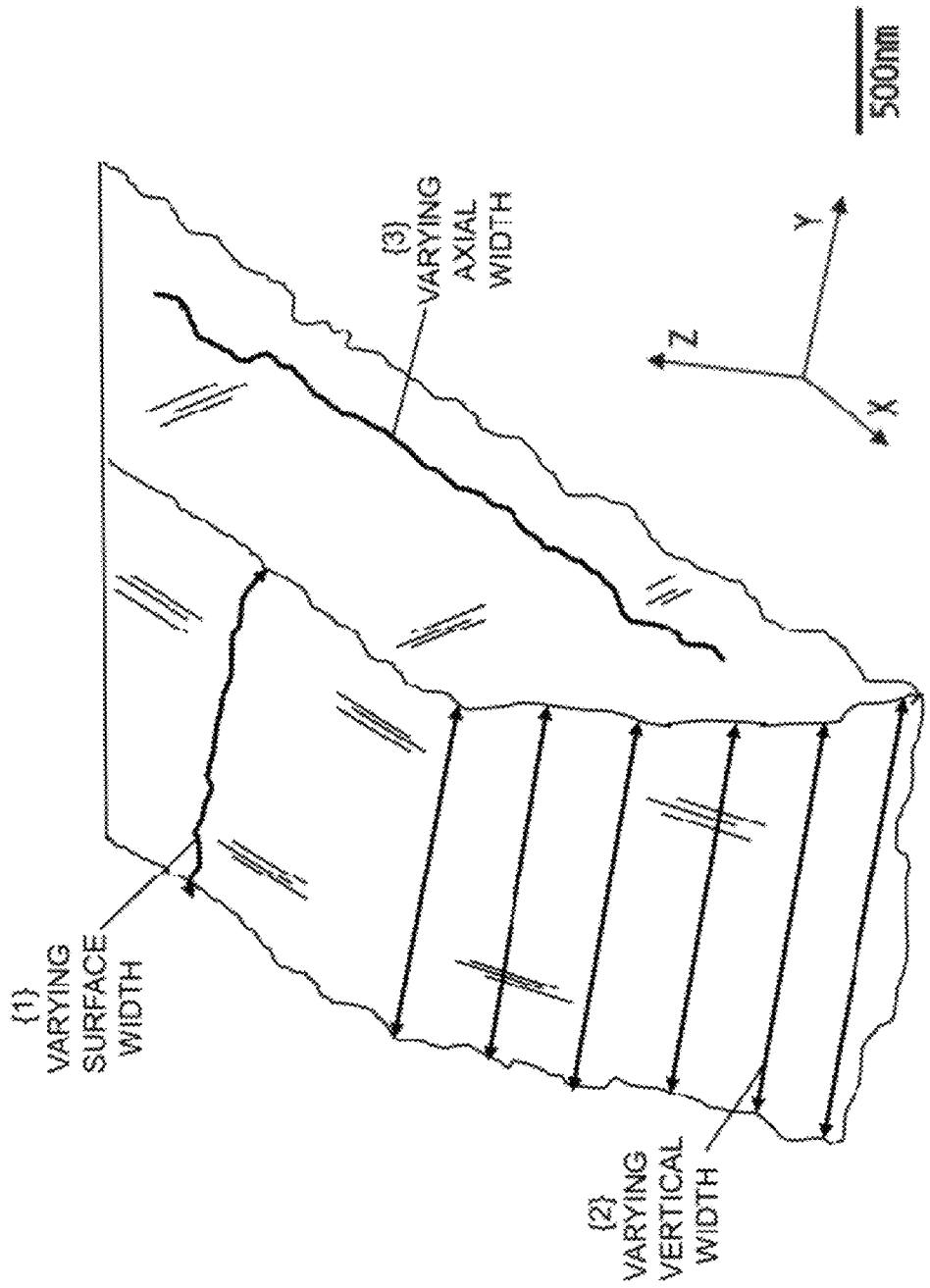
FIG. 4 is a cross-sectional view of a severed beam of a fabricated device illustrating variations in the geometry of the beam.

Another problem faced at the micro and nano-scale is the definition of geometry. FIG. 4 illustrates a cross section of a severed beam. This beam has varying axial widths, varying surface widths and along its cross-section, and varying vertical widths. These geometric variations make it difficult to determine an effective width of the beam.

Figure 5:
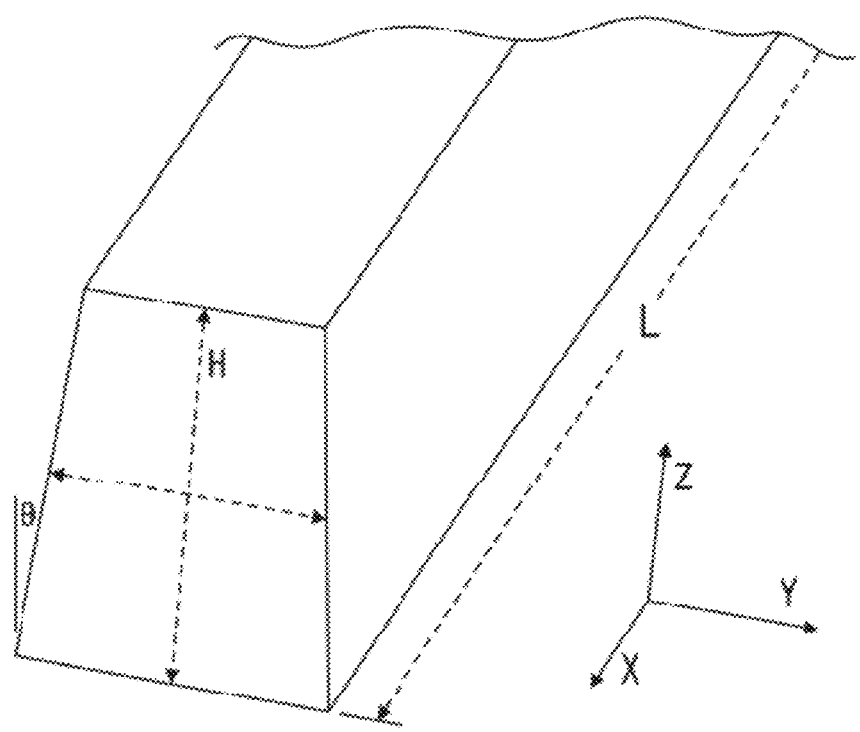
FIG. 5 is an experimentally accurate analytical model of the beam of FIG. 4.

EMM can be thought of as a way to determine the properties of a model such that it matches the performance of a true device. A model of the beam of FIG. 4 is shown in FIG. 5. If the same forces are applied to the beams and they yield the same deflections, then we say that the geometry and material properties of a model are assumed to be the effective geometry and material properties of the true device. In essence, what we have done is to create experimentally-accurate analytical model shown in FIG. 5. That is, given identically applied forces, EMM determines the geometric and material properties of the model that are required for it to precisely match the performance of the true device. The PI calls these properties performance-based, effective properties of the true structure. A common misconception is idea that the average value of profilometry can be used as beam width; however, since the second moment of area is nonlinear in width, supper position cannot be applied.

Figure 6:
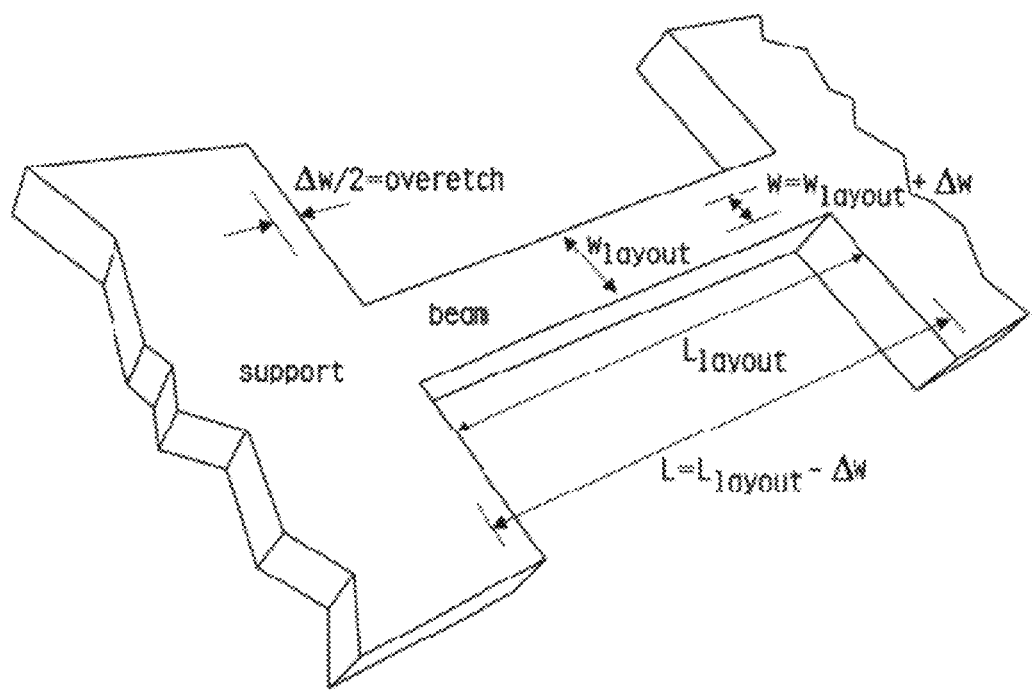
FIG. 6 is a diagrammatical illustration of how the difference between layout geometry and fabrication geometry (Δw) affects a width, gap, and length of fabricated devices.

An illustration of how uncertainty significantly affects performance is now provided. FIG. 6 illustrates the difference between layout and fabrication of a proportion of a sample device. $\Delta w$ is the difference between layout and fabrication. $\Delta w$ affects geometry such as width, gap and length as illustrated in FIG. 6. This differing geometry also affects property such as mass, damping, stiffness, resistance, capacitance, or the like.

The Tang Resonator is one of the most popular micro electro mechanical systems or MEMS. There is about a 2 micro meter gap between the moveable structure and the substrate. The moveable structure is attached to the substrate with two anchors. Electrostatic forces at the comb drive are able to excite the structure to oscillate in the x direction. The stiffness depends on geometrical parameters such as layer thickness h, links of beams L, second moments of areas I and material properties such as Young's modulus E. These properties are not well known. The question is how does an uncertainty in these properties affect performance.

If $\Delta w$ is defined as the difference between layout and fabrication, then $\Delta w$ affects geometry such as width, gap and length. Geometry also affects such quantities as mass, damping, stillness, resistance, capacitance, etc.

The stiffness of a Tang Resonator is a convoluted function of lengths and second moments of areas. Second moments of areas have a cubic dependence on width. We add $\Delta w$ to all of the widths, and we subtract $\Delta w$ from all the lengths. The stiffness is a function of several unknowns. Given layout parameters and nominal values, we do not know the difference in going from layout to fabrication $\Delta w$ or, in other words, the error $\Delta w$. We also don't know the error in Young's modulus $\Delta E$ and we do not know the error in layer thickness $\Delta h$.

Figure 7:
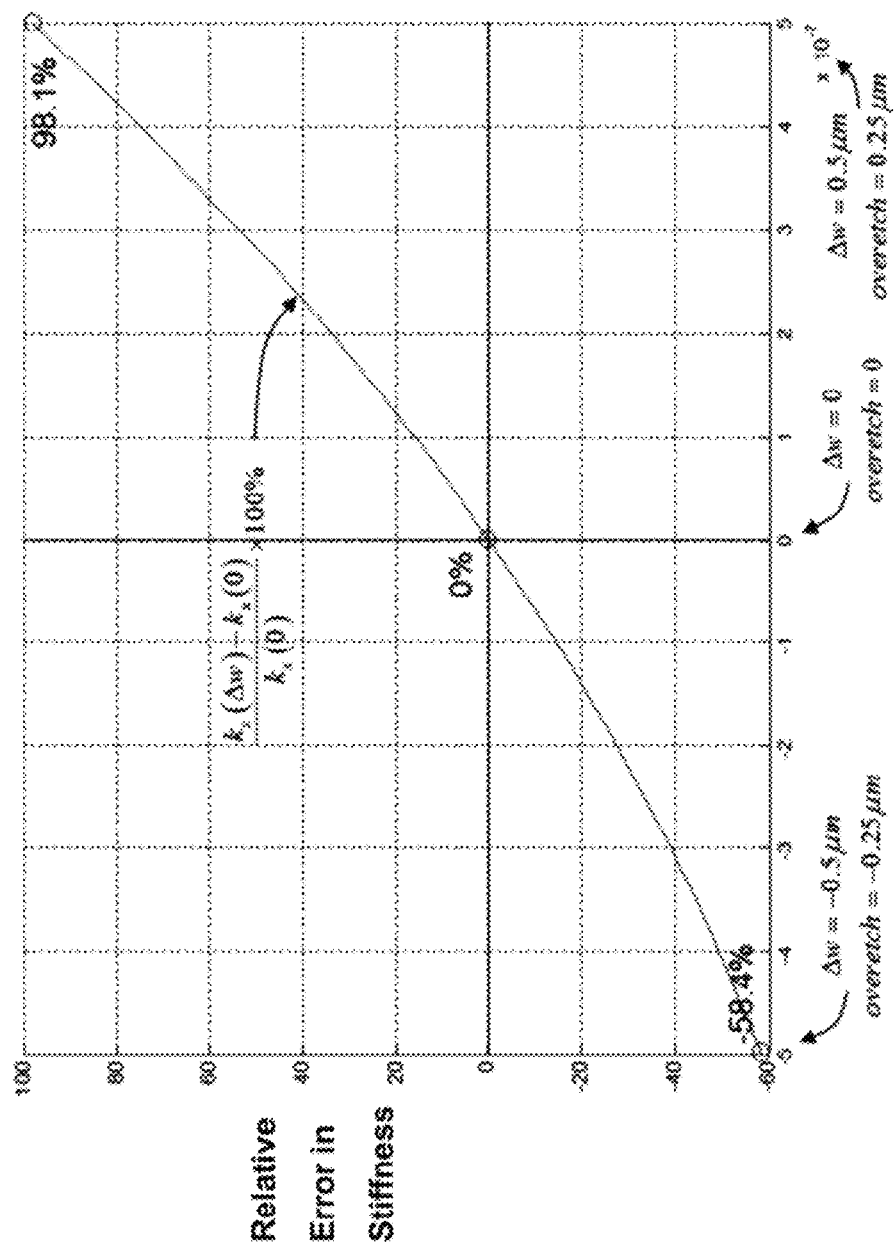
FIG. 7 is a graph illustrating relative error in stiffness of a fabricated device due to Δw.

Using this stiffness function, a plot the relative error in stiffness as a function of $\Delta W$ is shown in FIG. 7. Its quite common to have a 2 micro meter beam over etched by as much as a quarter of a micron. As illustrated in FIG. 7, relative error in stiffness can be as high as 98%. This implies that the fabricated device can have a stiffness that is twice as much as that predicted using layout parameters.

Figure 8:
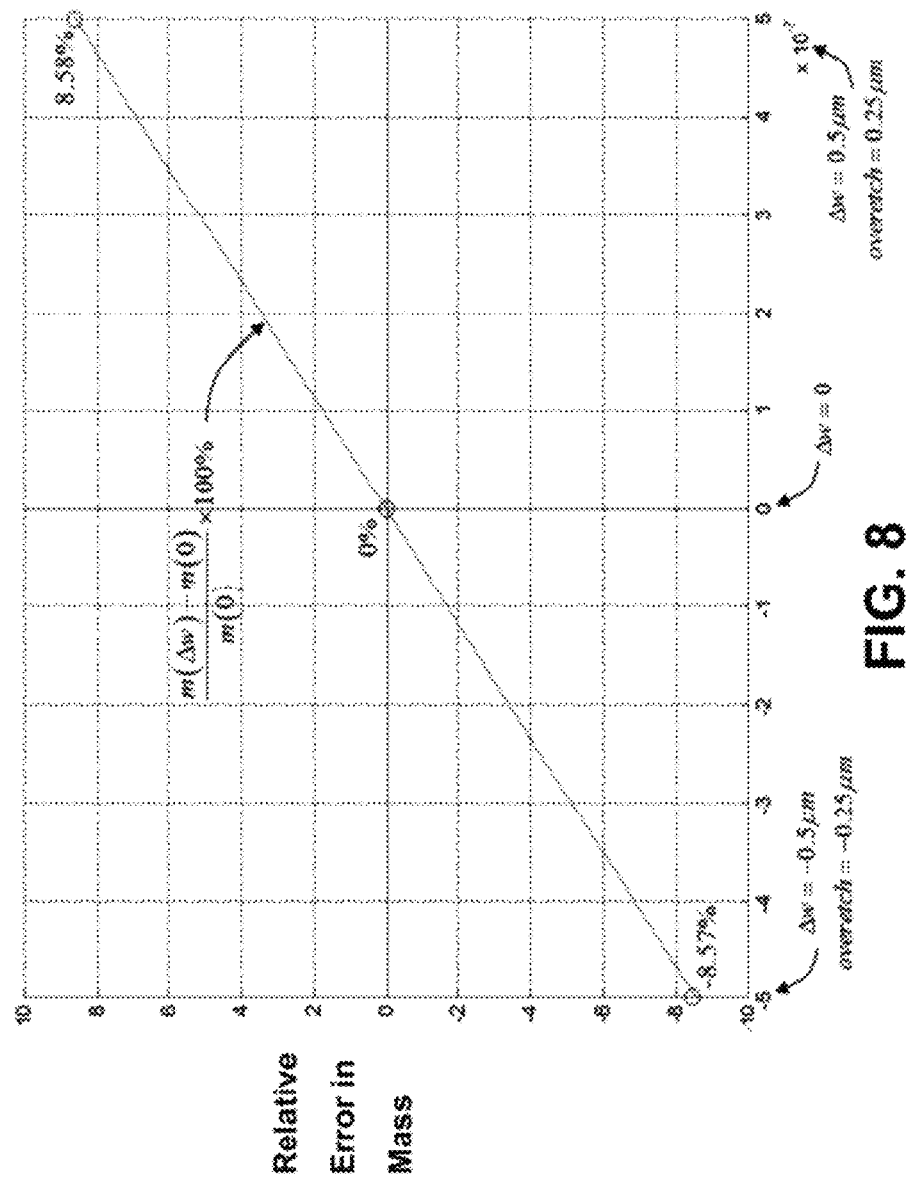
FIG. 8 is a graph illustrating relative error in mass of a fabricated device due to Δw.

The relative error in mass of a Tang Resonator due to the same range in $\Delta w$ is shown in FIG. 8. Although mass is not as sensitive to $\Delta w$ as stiffness, the fabricated device mass can differ from the mass predicted using layout parameters by as much as 8%

Figure 9:
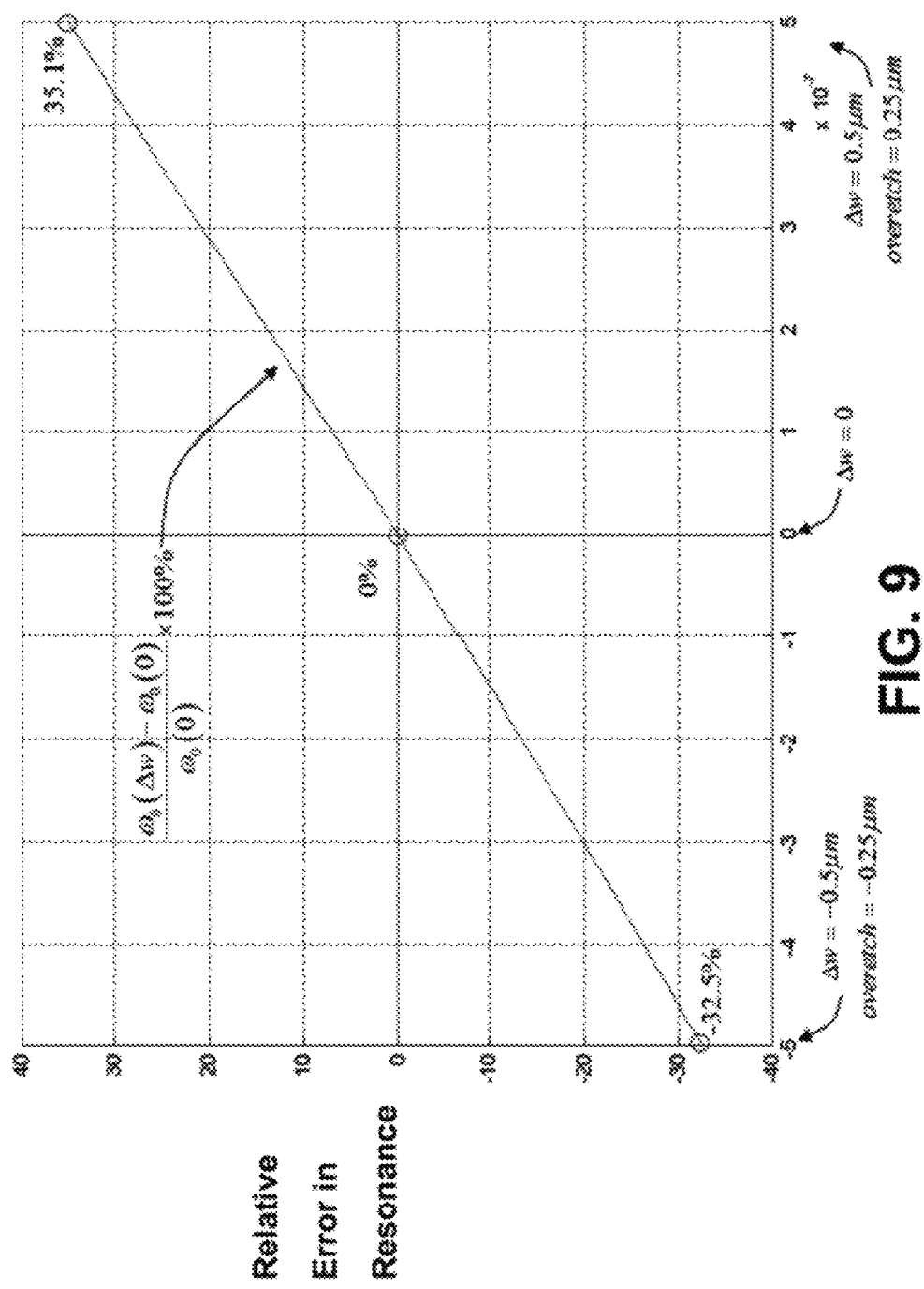
FIG. 9 is a graph illustrating relative error in resonance of a fabricated device due to Δw.

The relative error in resonance frequency due to $\Delta w$ is shown in FIG. 9. The resonance frequency of the fabricated device can differ from the resonance frequency predicted using layout parameters by as much as 35%.

Figure 10:
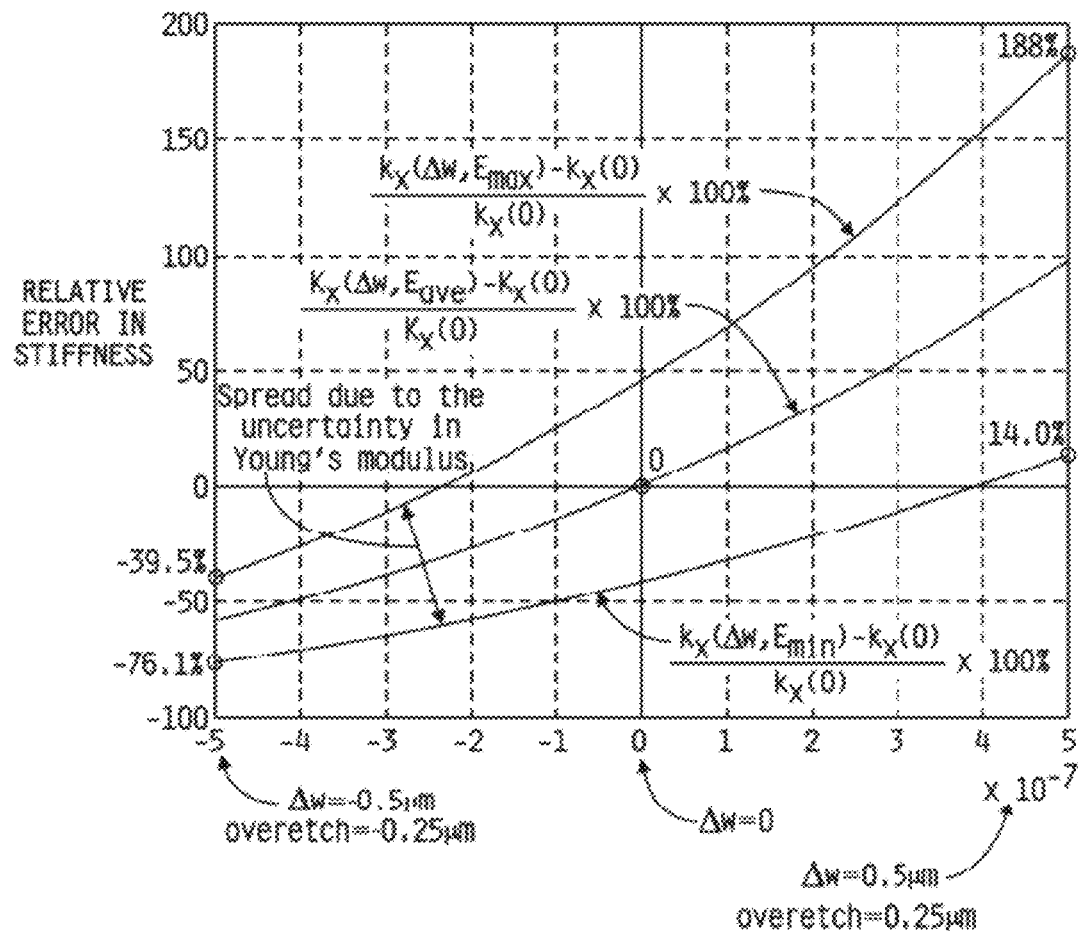
FIG. 10 is a graph illustrating the relative error in stiffness due to both Δw and Young's modulus (ΔE)

Recall that $\Delta W$ is not the only unknown. Layer thickness h and Young's modulus E are also unknown. Another example is shown in FIG. 10, a plot of the relative error in stiffness is given as a function of over-etch and Young's modulus. For a 2 µm-width cantilever, a 10% error in width implies a 100% change in stiffness. The uncertainty in Young's modulus widens the curve, achieving as much as 188% change in stiffness.

If stiffness is measured and it precisely matches the predicted stiffness, then looking at the 0 horizontal line which intersects the Y band, there is about a 0.6 micrometer range for $\Delta w$. Therefore, precisely matching stiffness still leaves geometry and Young's modulus undetermined.

Figure 11:
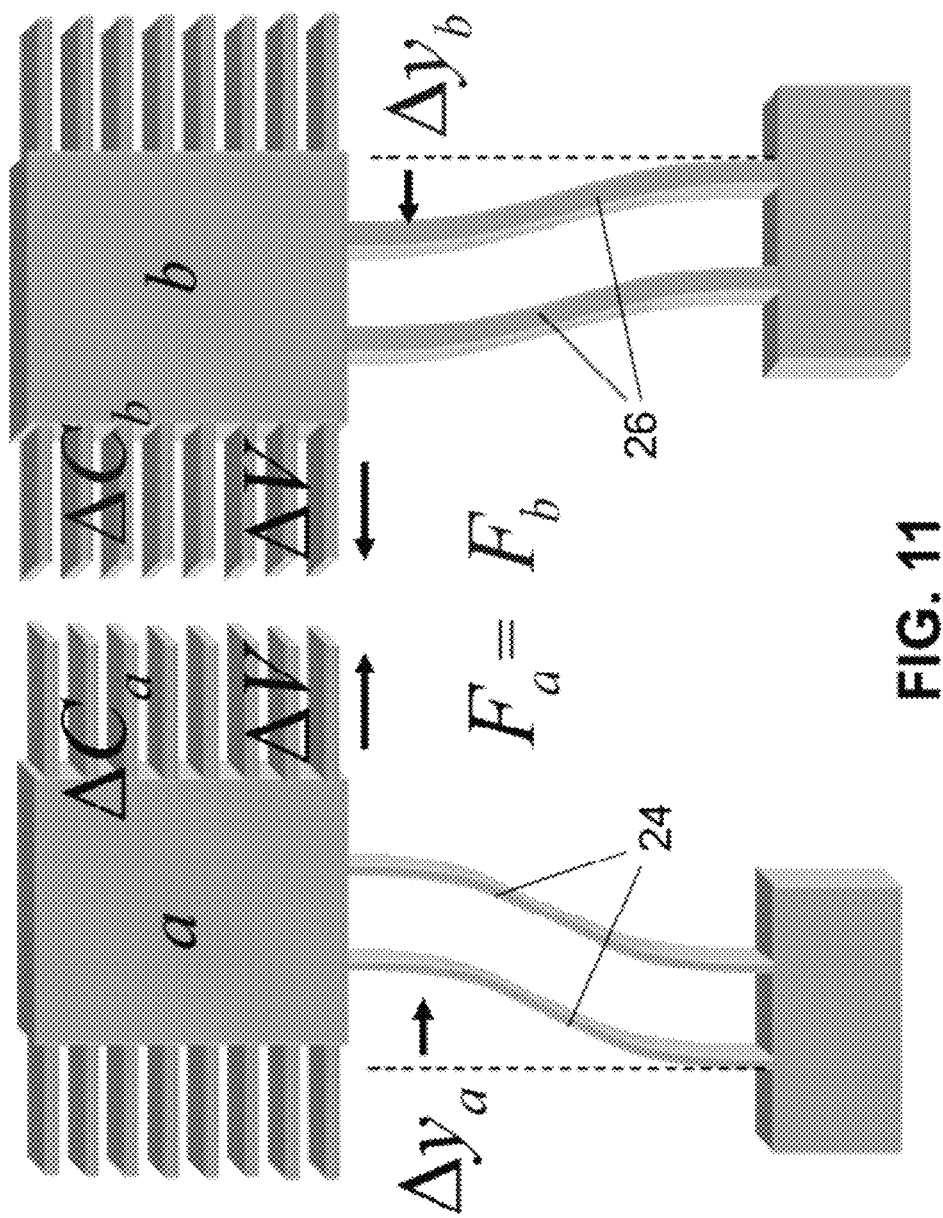
FIG. 11 is a diagrammatically view of two EMM test structures used to derive Δw in accordance with the present invention.

The EMM test structure of FIGS. 1-3 may be used to derive $\Delta W$. Illustratively, two such test structures are fabricated side-by-side as shown in FIG. 11, such that they have undergone the same deposition rates, the same concentrations, temperatures and pressures, the same diffusion rates, the same etch rates, the same misalignments. Therefore, these structures have the same errors. When a potential difference is applied at the comb drive to generate a force, the force that is being generated is unknown but since the comb drives are the same, the forces $F_a$ and $F_b$ will be the same as shown in FIG. 11. The widths of the flexures or beams 26 of structure b are slightly larger than the widths of the flexures or beams 24 of structure a; otherwise the two structures are identical. C, k, and y are capacitance, stiffness, and displacement respectively. The two structures are actuated by the same voltage source. Since their comb drives share the same processing errors, they generate the same force (to be determined).

Figure 12:
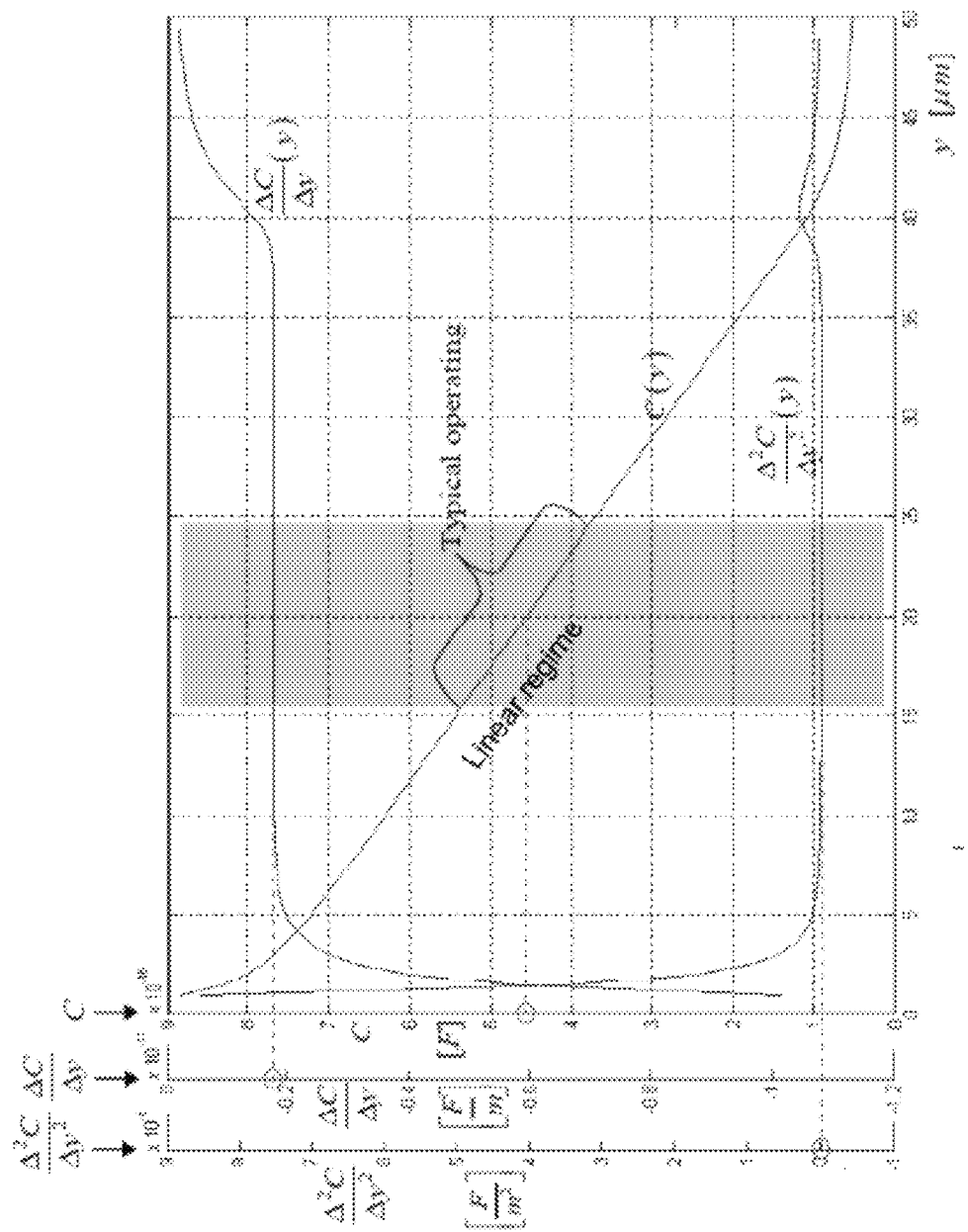
FIG. 12 is a graph illustrating capacitance and its first and second derivatives on the y axis and deflection of a comb drive along the x axis.
Figure 13:
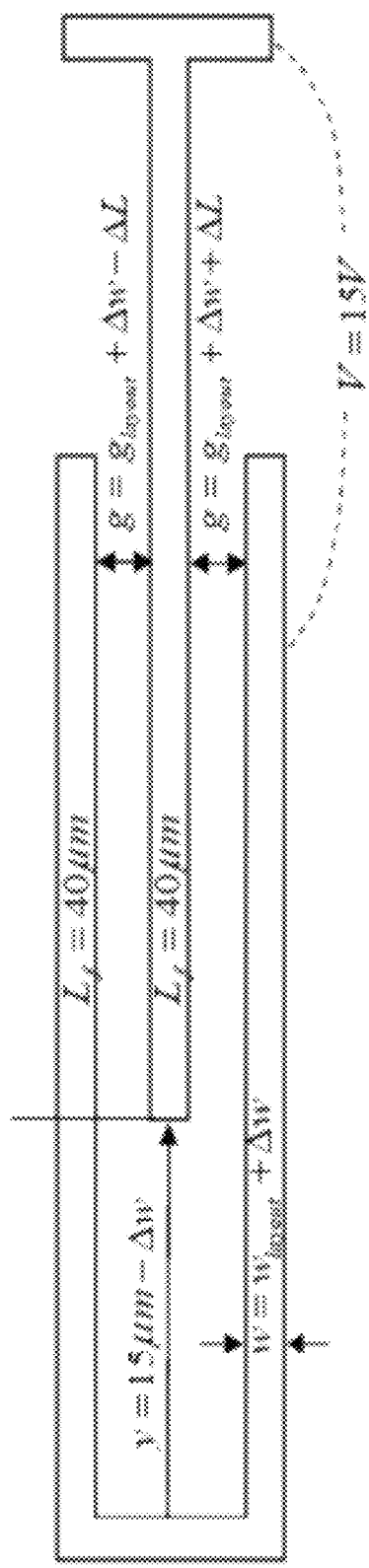
FIG. 13 illustrates details of a single comb finger of the comb drive.

It is worth noting that for a comb drive there is a nice linear regime about its operating point. FIG. 12 is a plot illustrating capacitance and its first and second derivative on the y axis. On the x axis, FIG. 12 shows deflection which corresponds to the single comb finger shown in FIG. 13. Method of moments was used for this data. The comb finger has fringing electric fields along with the equal potentials.

Therefore, when operated within the linear regime of FIG. 12, the partial derivate may be replaced with the differences. That is, partial derivative of capacitance with respect to displacement becomes the change in capacitance divided by the change in displacement as follows:

$$F_a = \frac{1}{2}\Delta V^2 \frac{\Delta C_a}{\Delta y_a}$$

and $$F_b = \frac{1}{2}\Delta V^2 \frac{\Delta C_b}{\Delta y_b}$$

From mechanics, since the forces are equal, the stiffness times are equated to deflection for each structure.

$$F_a = F_b$$
$$\Downarrow$$
$$k_a \Delta y_a = k_b \Delta y_b$$
$$\Downarrow$$
$$\frac{\Delta y_a}{\Delta y_b} = \frac{k_b}{k_a} = \frac{3Ehw_b^3/12L^3}{3Ehw_a^3/12L^3}$$
$$\Downarrow$$
$$\frac{\Delta y_a}{\Delta y_b} = \frac{w_b^3}{w_a^3}$$

On the third equation, we rewrite the second equation in terms of ratios of deflections equaling the ratios of stiffness. Since stiffness is proportional to width cubed, Young's modulus and layer thickness, which is assumed to be equal on both structures, cancel out. Therefore, the ratio of displacements equals the ratio of width cubed as shown above.

Using electrostatics, since the forces are equal, the electrostatic forces are equated. The voltages that were applied are equal. Therefore, the second equation is rewritten in terms of a ratio of displacements equaling a ratio of change of measured capacitance.

$$F_a = F_b$$
$$\Downarrow$$
$$\frac{1}{2}\Delta V^2 \frac{\Delta C_a}{\Delta y_a} = \frac{1}{2}\Delta V^2 \frac{\Delta C_b}{\Delta y_b}$$
$$\Downarrow$$
$$\frac{\Delta y_a}{\Delta y_b} = \frac{\Delta C_a}{\Delta C_b}$$

The results of mechanics are coupled with electrostatics by equating the ratio of displacements. That is, the ratio of displacements is equal to the ratio of change of capacitances and that's equal to the ratio of widths cubed. The fabricated widths are equal to a layout width plus $\Delta W$.

$$\frac{\Delta y_a}{\Delta y_b} = \frac{\Delta C_a}{\Delta C_b} = \frac{w_b^3}{w_a^3}$$
$$w_b = nw_{a,layout} + \Delta w$$
$$w_a = w_{a,layout} + \Delta w$$

Since the layout width is known and since capacitance can be measured, the only unknown left is $\Delta W$ which is the difference between layout and fabrication. Solving for $\Delta W$, we obtain the following expression:

$$\Delta w = \left( \frac{n\left(\frac{\Delta C_b}{\Delta C_a}\right)^{1/3} - 1}{\left(\frac{\Delta C_b}{\Delta C_a}\right)^{1/3} - 1} \right) w_{a,layout}$$

Figure 14:
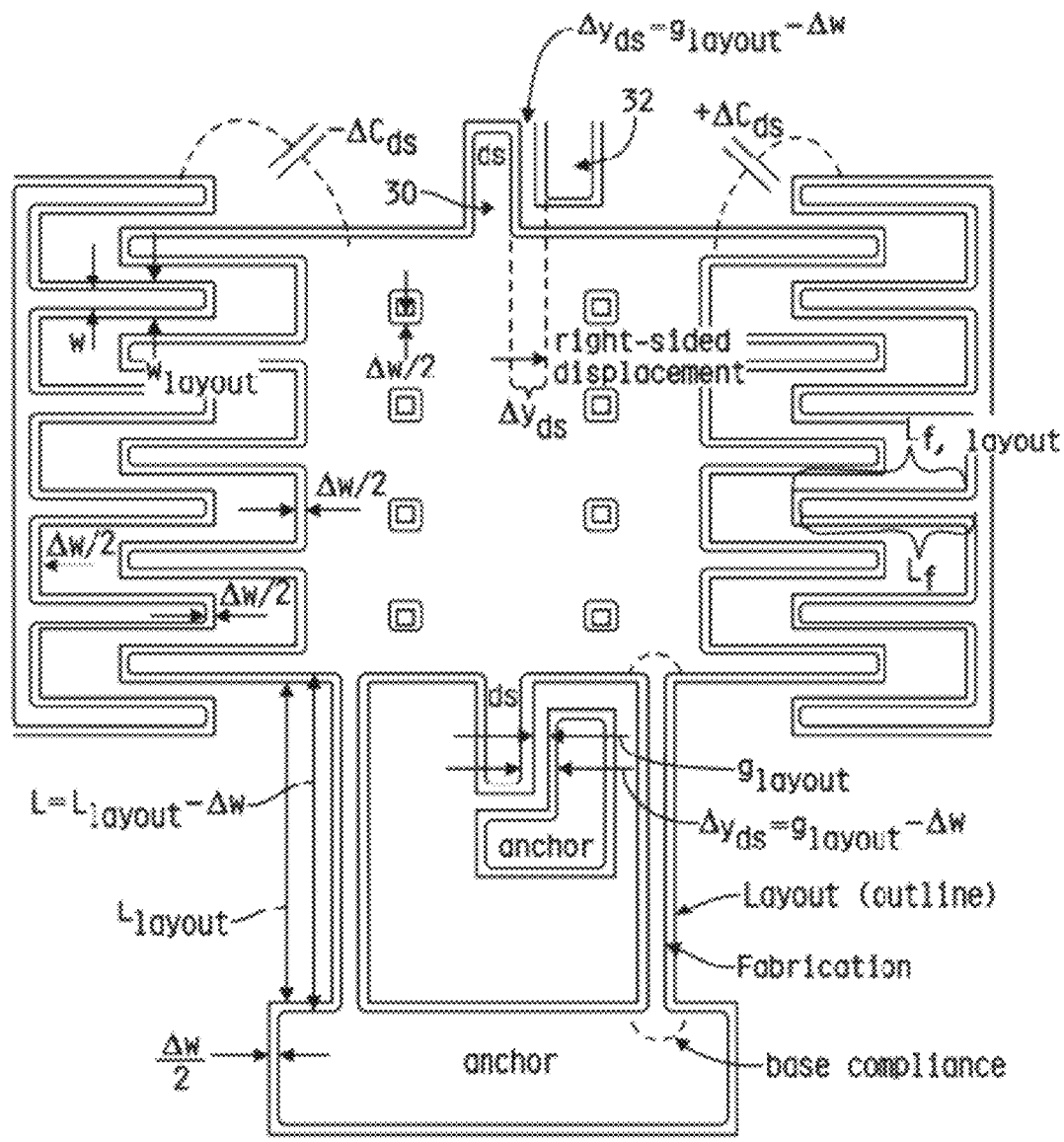
FIG. 14 illustrates that all the dimensions of the comb drive can be determined once Δw is determined.

Therefore, $\Delta w$ is expressed in terms of exactly known layout parameters and precisely measured change of capacitances. Since $\Delta W$ is accurately obtained using the formula above, all planar geometries become available at once. All the widths, all the gaps, all the lengths, etc. of the fabricated device are then known as illustrated in FIG. 14 and shown below.

$$w = w_{layout} + \Delta w;$$

$$g = g_{layout} - \Delta w;$$

$$L = L_{layout} - \Delta w;$$

$$L_f = L_{f,layout};$$

$$A_{plate} = (L_{1,layout} + \Delta w)(L_{2,layout} + \Delta w)$$

$$-N_H(H_{layout} - \Delta w)^2;$$

$$A_{comb} = N_f L_{f,layout}(w_{layout} + \Delta w);$$

$$A_{kbeam} = (L_{layout} - \Delta w)(w_{layout} + \Delta w);$$

$$R = R_{layout} + \Delta w/2;$$

etc.

Every time total capacitance is measured with a probe tip, the parasitic capacitance changes. That is, every experiment has a different total capacitance. However, measuring the change in capacitance allows us to achieve repeatability. That is, the parasitic capacitances cancel in the difference and what is left over is a difference in capacitance and uncertainty which adds in quadrature.

Next, it is determined how uncertainty in capacitance affects $\Delta W$. The following expression is used for $\Delta w$ with capacitance added in.

$$\Delta w(\delta C) = \left( \frac{n\left(\frac{\Delta C_b + \sqrt{2}\,\delta C}{\Delta C_a + \sqrt{2}\,\delta C}\right)^{1/3} - 1}{\left(\frac{\Delta C_b + \sqrt{2}\,\delta C}{\Delta C_a + \sqrt{2}\,\delta C}\right)^{1/3} - 1} \right) w_{a,layout}$$

Using sensitivity analysis, it is determined how uncertainty in geometry depends on uncertainty in capacitance. Using the last expression for $\Delta W$ above, let's expand it using a Taylor series about the uncertainty capacitance $\delta C$. The third equation shows that everything is in terms of exactly known layout parameters and precisely measured capacitance. The second term in the third equation is the uncertainty in geometry. The bracket expression is the sensitivity and it is multiplied by the uncertainty in capacitance. The sensitivity may be quite large. Therefore, it is important that the uncertainty be very small such that the uncertainty in geometry is small.

$$\Delta w(\delta C) = \Delta w \pm \left[\frac{\partial w}{\partial \delta C}\right]\delta C$$

$$= \Delta w \pm \delta w$$

uncertainty in geometry $$= \left(\frac{n\left(\frac{\Delta C_b}{\Delta C_a}\right)^{1/3} - 1}{\left(\frac{\Delta C_b}{\Delta C_a}\right)^{1/3} - 1}\right) w_{a,layout} \pm \left[\frac{\left(\frac{\Delta C_b}{\Delta C_a}\right)^{1/3}(\Delta C_a - \Delta C_b)(1-n) w_{a,layout}}{3\Delta C_a \Delta C_b \left(\left(\frac{\Delta C_b}{\Delta C_a}\right)^{1/3} - 1\right)^2}\right]\delta C$$

Some numbers may be plugged into this equation to determine the expected uncertainty. The parameters we will use are an over-etch of 0.2 microns, a beam width of 2 microns, a beam length of 1000 microns, a beam thickness of 2 microns, layout parameter n=2, lap, number of comb fingers 50, Young's modulus 170 GPa, gap spacing 2 microns, comb-finger overlap 20 microns, applied voltage of 50 volts. This implies that the change in capacitance on test structure a is:

$$\Delta C_a = 5.41 \times 10^{-13} F$$

For test structure b, the change in capacitance is:

$$\Delta C_b = 7.78 \times 10^{-14} F$$

The sensitivity is quite large as follows:

$$\left[\frac{\partial w}{\partial \delta C}\right] = 1.88 \times 10^8 \frac{m}{F}$$

Recall that the uncertainty in geometry is equal to a very large sensitivity times a very small uncertainty in capacitance. If an Attofarad capacitive resolution, such as found in an ADI chip or an Agilent LCR meter, is used, then $$\delta C = O(10^{-18})$$

What results is a $\Delta W$ of 0.2 microns±about 2 angstroms as shown below. This uncertainty in geometry is about the size of a silicon atom.

$$\Delta w(\delta C) = \Delta w \pm \left[\frac{\partial w}{\partial \delta C}\right]\delta C$$

$$= 0.2 \times 10^{-6} \pm [1.88 \times 10^8] \times 10^{-18}$$

$$= 0.2 \times 10^{-6} \pm 1.88 \times 10^{-10}$$

If the Attofarad uncertainty in capacitance is replaced with Zeptofarad capacitive resolution so that:

$$\delta C = O(10^{-21})$$

Zeptofarad capacitance resolution has been reported by the Thomson group at the University of Manitoba using off chip electronics. ADI has also reported Zeptofarad capacitance resolution using their ADXRS-150 gyros. What results is a $\Delta W$ of 0.2 microns±a geometric uncertainty of about 200 femtometers as follows:

$$\Delta w(\delta C) = \Delta w \pm \left[\frac{\partial w}{\partial \delta C}\right]\delta C$$

$$= 0.2 \times 10^{-6} \pm [1.88 \times 10^8] \times 10^{-21}$$

$$= 0.2 \times 10^{-6} \pm 1.88 \times 10^{-13}$$

After measuring geometry, we now measure force and displacement. One way to calibrate force is by using displacement stops. Since we know a geometry, we know the gaps between structures. Using displacement stops such as stops 30 and 32 shown in FIG. 14, a voltage is applied on the comb drive which deflects it to the right. Once stop 30 contacts the displacement stop 32, the change in capacitance is measured.

As long as operation occurs within the linear regime of the comb drive shown in FIG. 12, the ratio of changed capacitance to displacement is a constant. Since we just measured $\Delta C_{ds}$ and $\Delta y_{ds}$, let's call that ratio the comb drive constant unsilon.

$$F = \frac{1}{2}\frac{\partial C}{\partial y}\Delta V^2$$

$$= \frac{1}{2}\left[\frac{\Delta C_{ds}}{\Delta y_{ds}}\right]\Delta V^2$$

$$= \frac{1}{2}\Upsilon\Delta V^2$$

Where $$\Upsilon = \frac{\Delta C_{ds}}{\Delta y_{ds}}$$

is the comb drive constant.

The sensitivity analysis of force requires a multivariable Taylor expansion because now these are uncertainties in capacitance and voltage.

$$F(e + \delta e) = F(e) + \sum_{i=1}^{4} G_i(e)\delta e_i + \sum_{i=1}^{4}\sum_{j=1}^{4}\delta e_i H_{ij}(e)\delta e_j + \ldots$$

-continued $$e = \begin{pmatrix} \Delta C_{ds} \\ \Delta C_a \\ \Delta C_b \\ \Delta V \end{pmatrix}, \delta e = \begin{pmatrix} \delta C_{ds} \\ \delta C_a \\ \delta C_b \\ \delta V \end{pmatrix}, G_i(e) = \frac{\partial F}{\partial e_i}, H_{ij}(e) = \frac{\partial^2 F}{\partial e_i \partial e_j}.$$

The uncertainty in force involves several terms. Each term is a product of sensitivity multiplied by a very small uncertainty in an electrical measurand e $$F(e + \delta e) = F(e) + \delta F(e, \delta e)$$

$$\delta F = |G|^T |\delta e|$$

$$= \left|\frac{\partial F}{\partial \Delta C_{ds}}\right| |\delta C_{ds}| + \left|\frac{\partial F}{\partial \Delta C_a}\right| |\delta C_a| + \left|\frac{\partial F}{\partial \Delta C_b}\right| |\delta C_b| + \left|\frac{\partial F}{\partial \Delta V}\right| |\delta V|$$

Applying the same parameters used above for geometry, the following is expected for force. Using a capacitive resolution on the order of attofarad, a resolution in force on the order of piconewtons is expected as shown below. With a zeptofarad resolution, an uncertainty in force on the order of tenths of femtonewtons is expected as also shown below.

$$\delta C = O(attofarad)$$

$$\delta C = O(zeptofarad)$$

$$\delta F = 2.40 \times 10^{-12} N$$

$$\delta F = 2.61 \times 10^{-16} N$$

$$F = 1.01 \times 10^{-8} N$$

$$F = 1.01 \times 10^{-8} N$$

$$\frac{\delta F}{F} = 2.39 \times 10^{-4}$$

$$\frac{\delta F}{F} = 2.59 \times 10^{-8}$$

As discussed above, the use of EMM improves the force levels capable of being detected compared to a mass balance on an atomic force microscope.

Measuring displacement can be achieved by equating the comb drive constant upsilon to any ratio of capacitance and displacement within the linear regime. Displacement is equal to the measurement of change of capacitance divided by upsilon. Expectations using zeptofarad capacitive resolution yields uncertainty and displacement on the order of 100 fm.

Sensitivity analysis shows that the performance of EMM is a strong function of geometrical design parameters. Error analysis shows that the precision of EMM is a function of capacitance resolution. Currently, the most precise capacitance measurements on a microchip are on the order of zeptofarads. Hence, depending on geometry and capacitance resolution, analytical, simulation, and error analysis show that measurements as precise as sub-piconewton forces and sub-picometer displacements are obtainable. Such well-calibrated devices lead to precise sensors and actuators as described herein.

Figure 15:
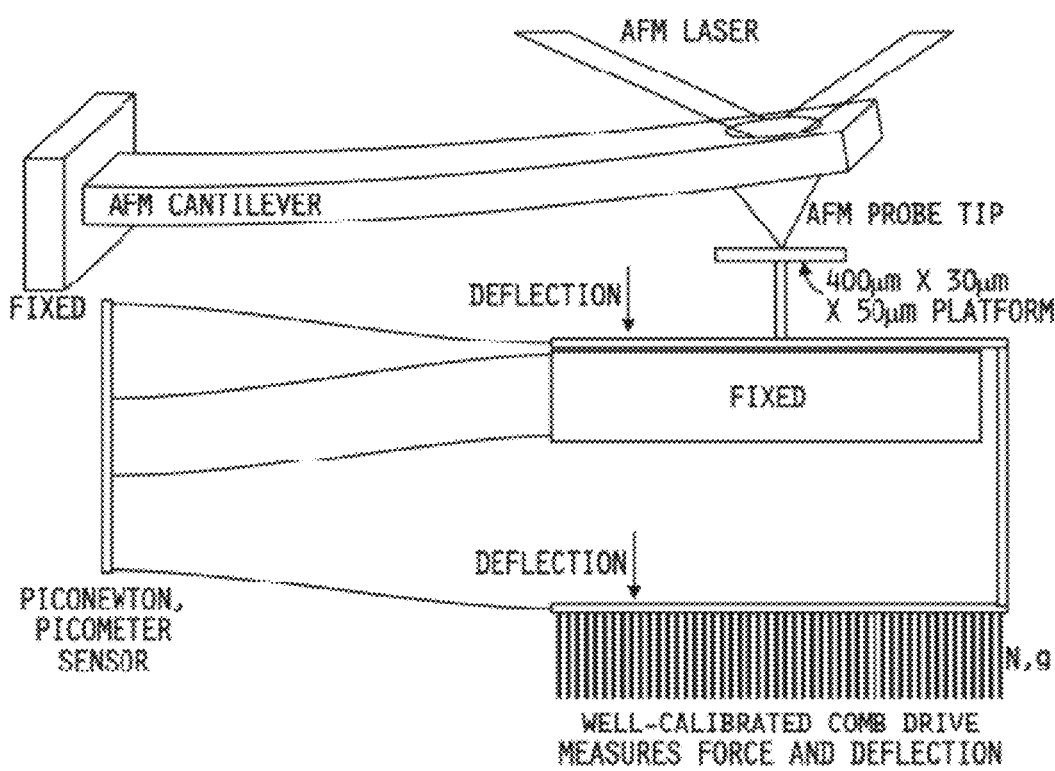
FIG. 15 is an illustrative embodiment of the present invention in which a well calibrated force displacement gauge of the present invention is used to calibrate the bending stiffness of an atomic force microscope cantilever.
Figure 16:
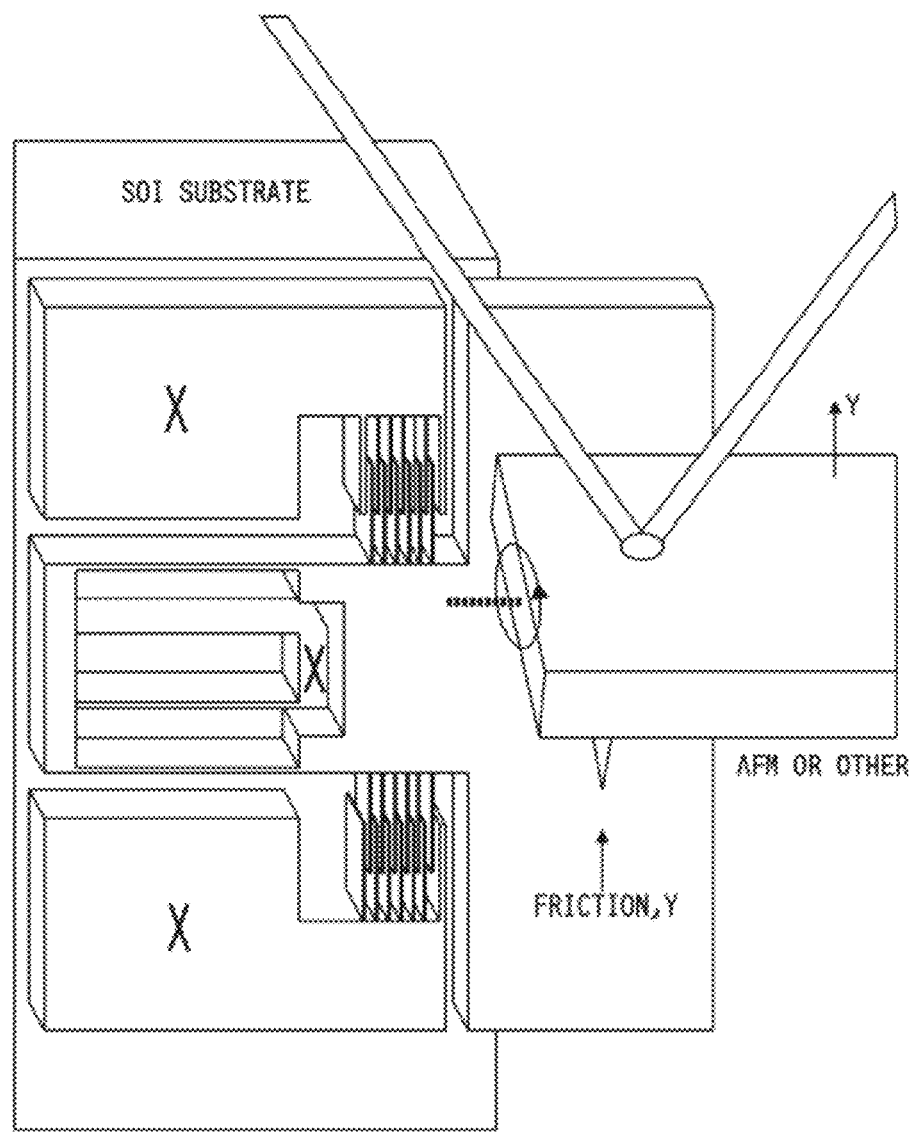
FIG. 16 is a diagrammatical view in which a well calibrated force sensor of the present invention is used to calibrate torsional stiffness of an AFM cantilever or to measure friction by sliding the AFM probe tip across the surface of the force sensor.
Figure 17:
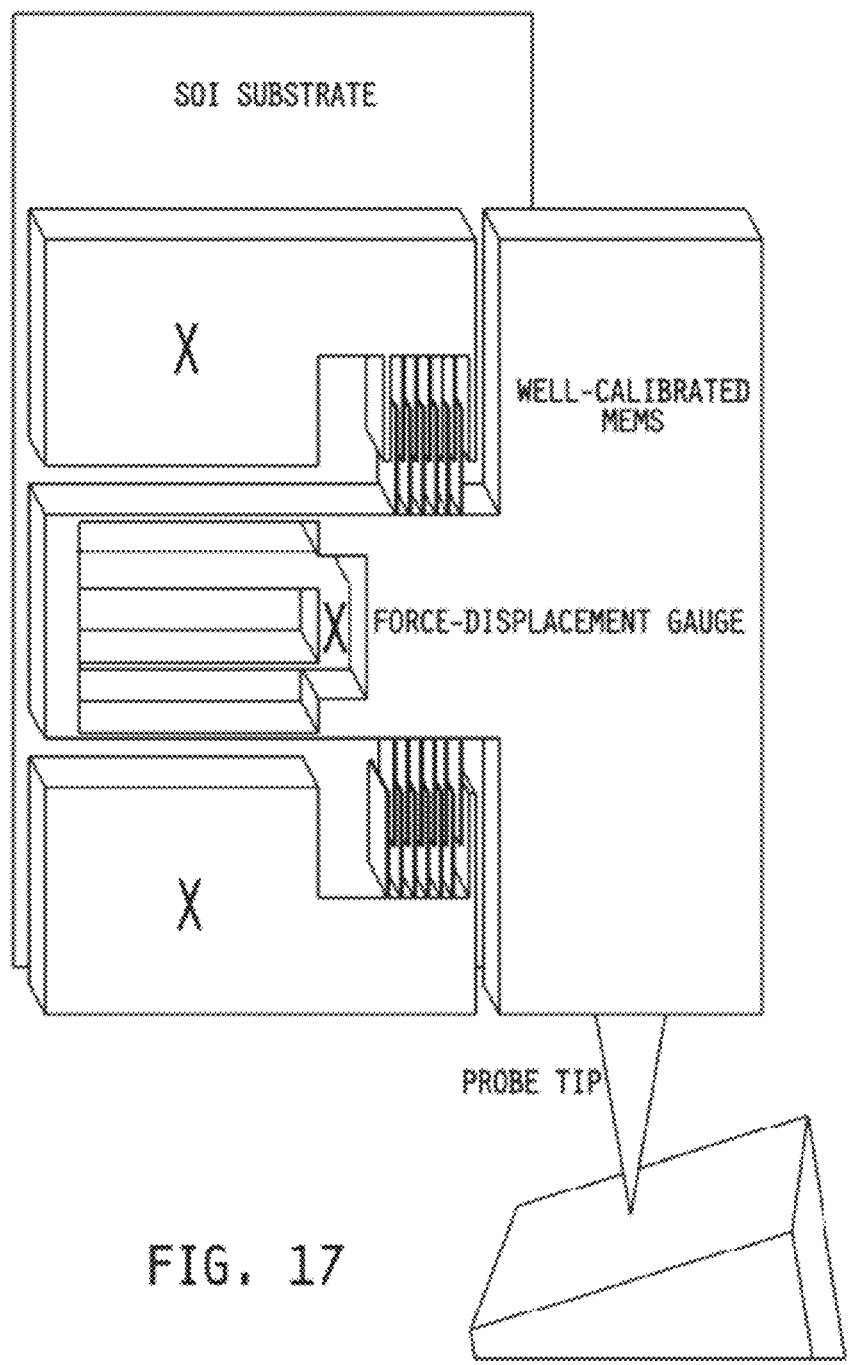
FIG. 17 is a diagrammatical view of another embodiment of the present invention in which an AFM probe tip is coupled directly to the well calibrated force displacement gauge of the present invention to produce an AFM several orders of magnitude more precise than a conventional AFM.

FIGS. 15-17 illustrate three applications of the EMM calibration system and method of the present invention. The first application shown in FIG. 15 is a device used to calibrate the bending stiffness of an AFM cantilever. This particular EMM device is fabricated using the SOI process. The thickness of this process is used as a surface for which to apply displacements and loads. Any displacement or load applied by the AFM can be sensed by a well calibrated EMM device.

Applications of the apparatus and method of the present invention are numerous. As an example, the present apparatus and method improves the precision of nanoscale force-deflection measurements.

AFM Cantilever Calibrator:

The conventional AFM is the industry standard device for nanotechnologists. The EMM device may be used by nanotechnologists to calibrate their AFMs, as illustrated in FIG. 15. Currently, AFM cantilevers are calibrated by the thermal method, added weight method, or geometrical method. Such methods are typically in error of 1 to 15% error as discussed above. In FIG. 15, a well-calibrated microdevice is used as a force-displacement gauge to calibrate an AFM in the bending mode. That is, since the geometric and material properties of the microdevice have been precisely determined, it becomes a well-calibrated sensor, able to characterize externally applied forces and displacement. The high precision of the EMM device offers a traceable method of calibration for both force and displacement.

A second AFM calibration application illustrated in FIG. 16 is a calibration of the torsional stiffness of an AFM cantilever. This embodiment may also be used to measure friction. This can be done by sliding the AFM probe tip across the surface of an EMM device.

This illustrated apparatus and method may be extended by attaching an AFM probe tip directly onto a well-calibrated microdevice, i.e. an AFM-on-a-chip, as depicted in FIG. 17. In doing so, we should achieve measurements of forces and displacements that are several orders of magnitude more precise than conventional AFMs. Although the conventional AFM cantilevers are microscale structures, they are not readily amenable to EMM technology.

DNA Sequencer:

FIG. 17 also illustrates a version of the present device used as a single-strand DNA sequencer. That is, the end of one strand of DNA is immobilized onto the EMM device, and the end of its adjoining strand is immobilized onto the substrate. The EMM device measures the forces required to separate the 10 piconewton AT bonds and the 15 piconewton GC bonds. By recording the required applied forces, the device has effectively sequenced the single DNA molecule.

Figure 18:
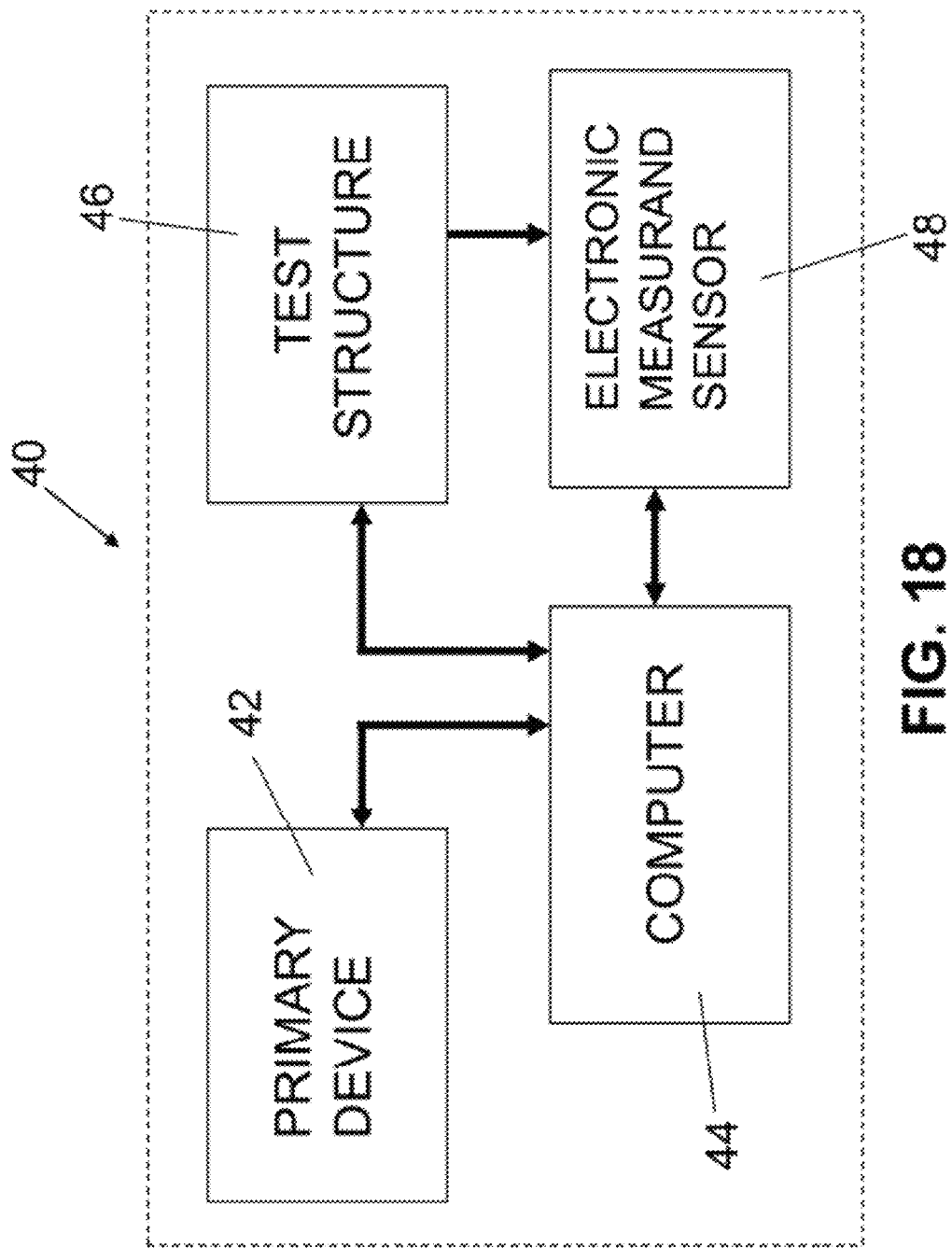
FIG. 18 is a block diagram illustrating components of an embodiment of the present invention in which a calibration device is integrated on the same chip with a primary devices to calibrate the primary devices and improve operation thereof.

Self-Calibrating Chips:

EMM may also be used to create microchips that are able to self-calibrate. One such configuration is illustrated in FIG. 18. Self calibration is useful for devices where precision is necessary in spite of harsh environmental change or long-term dormancy. Microsystems will be able to self-calibrate by fabricating EMM devices alongside the primary microsensor/actuators such that both the EMM device and primary device share the same material properties and geometrical errors to do process variations. Since the EMM device functions as a device which can determine its own properties, by doing so it has effectively determined the shared properties of its neighboring devices. This ability is especially important for distributed sensors which may lie dormant for years; or for micro sensors and actuators onboard space probe missions where drastic temperature and atmospheric changes may affect material properties or performance; or for missile defense where sensors must constantly recalibration as conditions change going from dormancy at desert temperatures, to 1000 miles per hour velocities, to exoatmospheric conditions. In addition, in stead of short-circuiting as conventional sensors do, EMM is also able to re-calibrate when exposed to aqueous environments.

Combining on-chip electrical circuits along with test structures allow packaged devices to measure their properties and recalibrate as conditions change. The subsystems of such an integrated MEMS/NEMS device are illustrated in FIG. 18. The device 40 includes a primary device 42 which may be any desired micro or nano-scale scale device which may be improved using the calibration techniques described herein. Non-limiting examples of such primary devices 42 include the atomic force microscope, gravimeter, AFM cantilever calibration device, single strand DNA sequencer, nanomanipulator, quality control for batch fabrication foundries, self-calibrating chips, altimeter, strain sensor, Casimir force sensor, or a biological force-displacement probe. In addition, primary device 42 may be a switch, tunable capacitor, tunable inductor, gyro, pressure sensor, resonator, or the like.

The primary device 42 is controlled by a computer 44 which may be on the same chip 43 or separate from the chip 43 of the primary device 42. Computer 44 may be any type of computer, processor or controller. The calibration device includes a test structure 46 on the same chip 43 with the primary device 42. In other embodiments, the test structure 46 may be separate from the chip 43 of the primary device 42. The test structure 46 may provide on-chip measurement of unknown variables likely to occur during fabrication as discussed herein. Illustratively, test structure 46 permits on-chip measurement of Young's modulus, density, stress, stain gradient, geometry, viscosity, stiffness, or the like. As discussed herein, EMM techniques are used to extract mechanical properties of the test structure 46 as functions of electronic measurands. These properties may be geometric, dynamic, material or other properties. Therefore, an electronic measurand sensor 48 is provided to measure the desired electrical measurand on the test structure 46. For instance, electronic measurand sensor 48 may measure capacitance, voltage, frequency, or the like. The electronic measurand sensor 48 may be on the same chip 43 with the test structure 46. In other embodiments, electronic measurand sensor 48 may be separate from the chip 43 of the test structure 46.

Computer 44 receives the output from electronic measurand sensor 48 and calculates the mechanical properties of the test structure 46 as functions of measured electronic measurands. For example, sensed capacitance may be used to calculate $\Delta w$ as described in detail herein. If the primary device 42 is on the same chip 43 as the test structure 46, then it can be assumed the at same mechanical properties of the test structure 46 may apply to the primary device 42. This is because the primary device 42 and the test structure 46 have undergone the same deposition rates, the same concentrations, temperatures and pressures, the same diffusion rates, the same etch rates, the same misalignments on the chip 43. Therefore, the computer 44 can use the calibration information from the test structure 46 and sensor 48 to control and/or improve the precision of the primary device 42.

Since EMM is performance-based, which matters most to industry developers and consumer, this technology may lead to much-needed micro/nanoscale standardization for accelerated technological advancement and improved international commerce.

The present invention overcomes problems associated with conventional oscillator and AFM designs (and other micro-fabricated devices) which are not well-calibrated. For example, conventional oscillator and AFM designs do not offer ways to determine its Young's modulus or stiffness, mass or material density, planar geometry, and layer thickness. Because of these problems, conventional micro-fabricated devices have a large amount of uncertainty, illustratively a 1% to about 20% error.

The apparatus and method of the present invention uses designs based on EMM, as described herein, which are well-calibrated. This makes the apparatus and method of the present invention several orders more precise than conventional devices.

Other applications of the EMM techniques described herein include:

Fundamental Forces:

By not attaching a probe tip, the Casimir force can be measured between the closing gap of two plates that are at the same potential.

Altimetry:

Due to EMM's ability to measure piconewton force, the device can be used to measure distance from the surface of the earth. An illustration of measuring height above earth is the following equation:

$$dF = GMm\left(\frac{1}{R^2} - \frac{1}{(R+h)^2}\right)$$

where: M is the mass of the earth, $5.974 \times 10^{24}$ kg
R is the radius of the earth, 3671 km
m is the effective proof mass, e.g. $5 \times 10^{-8}$ kg
h is the height of the device above the earth surface
G is the gravitational constant=$6.67 \times 10^{-11}$ m$^3$ kg$^{-1}$ s$^{-2}$
dF is the change in force. Minimum is the force resolution.

For example, if the sensor is to detect a change in height of 1 meter, then the force resolution should be 1 piconewton.

Conventional altimeters use pressure to determine altitude, which wildly fluctuates. An EMM-based altimeter does not require pressure, so the device can be enclosed in a package. It can also be used with GPS to allow for the out-of-plane dimension of position.

Gravimetry:

The EMM device's ability to measure the gravitational force allows it to be used as a gravimeter on a chip. Conventional gravimeters are very expensive, large, and not easily portable. Gravimeters are often used to discover oil deposits and other large underground deposits. In another embodiment, the gravimeter/altimeter device is sensitive enough to measure gravity difference of a few feet—such as moving between floors within a building.

Nanomanipulator:

The present device may also be used as a nanomanipulator. Current nanomanipulators cost tens of thousands of dollars, and they are not as precise as the present device, and they do not allow its user to measure force. However, incorporating both precise force and displacement sensing and actuation abilities in a nanomanipulator facilitates haptic force-feedback for the user. Such nanomanipulation will open the door to nanoscale assembly.

In-Situ Fabrication Metrology:

In-situ fabrication metrology requires an EMM device to provide measurement data during fabrication. In this set up, an EMM property diagnostic chip experiences high temperatures while self-calibrating, and measuring the properties of deposited layers. In this way, process parameters such as temperature, pressure, concentration and reactants may be monitored by a computer/controller and then modified during processing to maximize quality control.

Strain Sensor:

Due to EMM's ability to self-calibrate, changes in strain due to stress from thermal expansion or fatigue may be detected by sensing a change in comb drive deflection. Changes on the order of 100 femtometers have been detected in comb drives. EMM is able to precisely quantify such changes. Applications include monitoring the lifecycle of aircraft, buildings, dams, bridges, high-pressure containers, etc.

Figure 19:
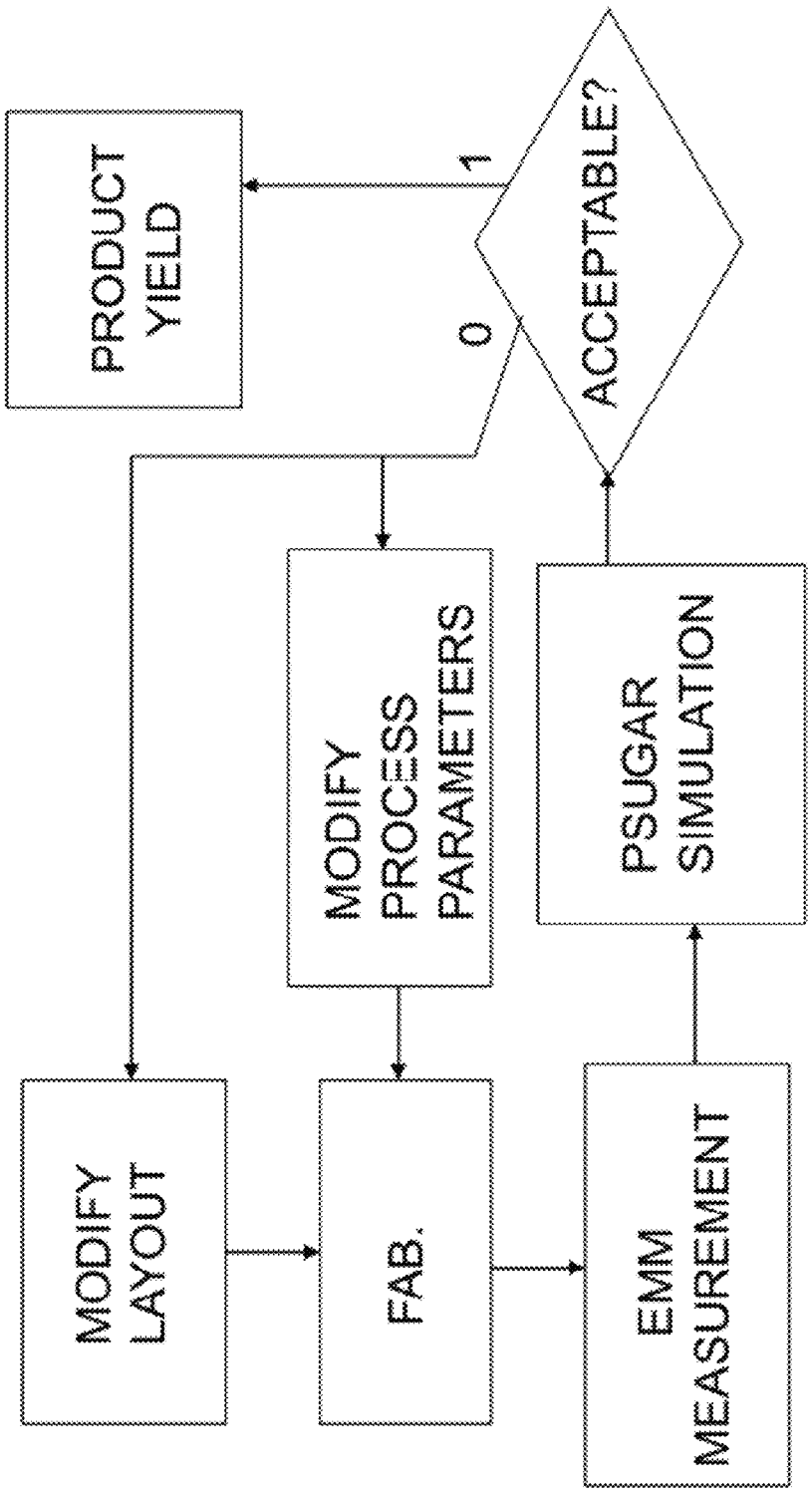
FIG. 19 is a block diagram illustrating a general process flow of an automatable fabrication process.
Figure 20:
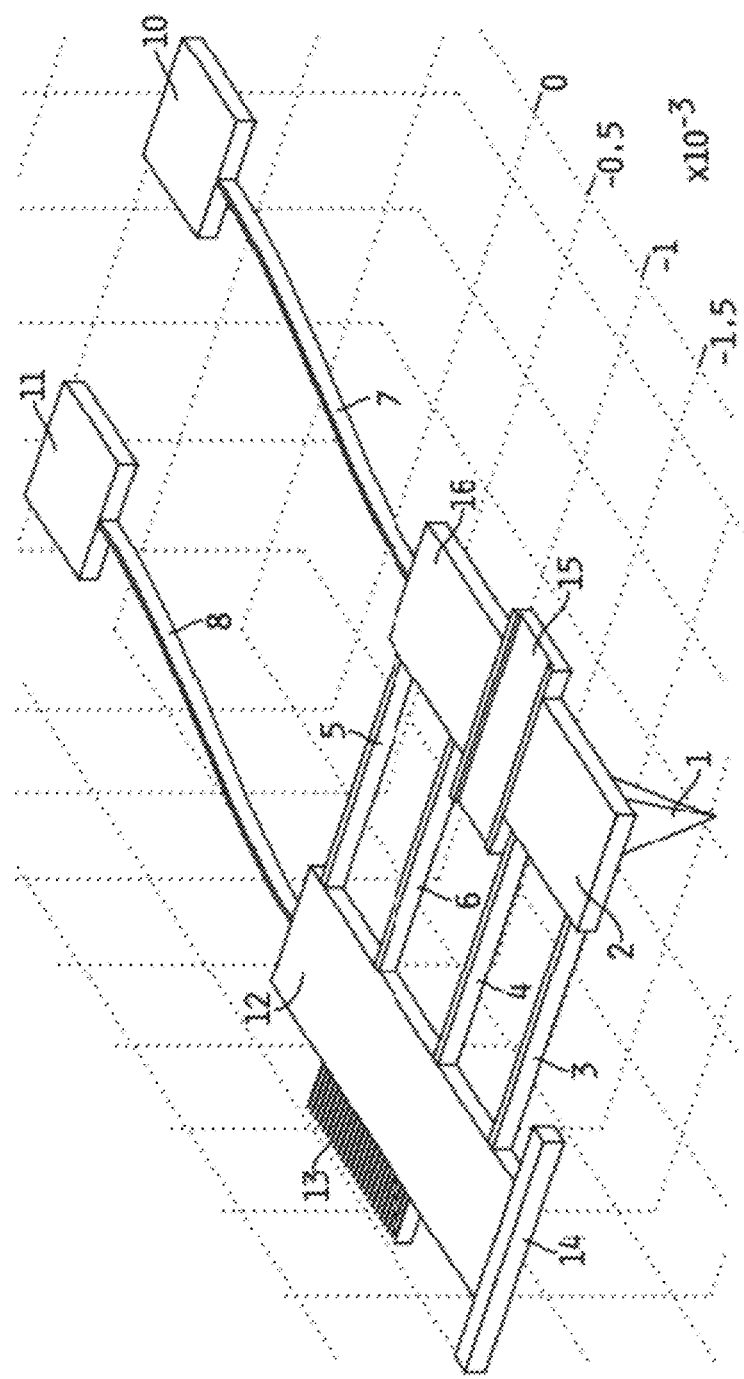
FIGS. 20-25 illustrate an illustrated embodiment of an atomic force microscope having three degrees of freedom of movement.
Figure 21:
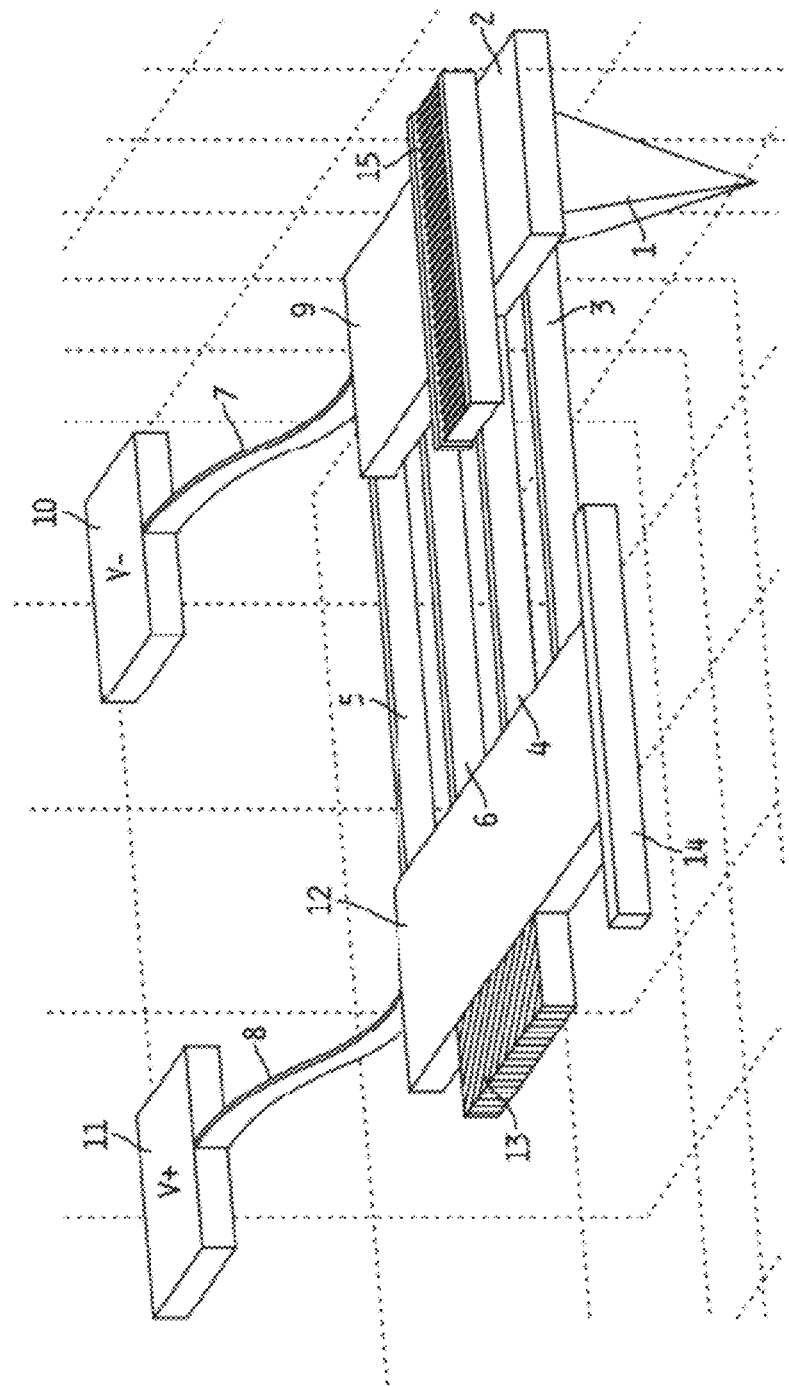
Figure 22:
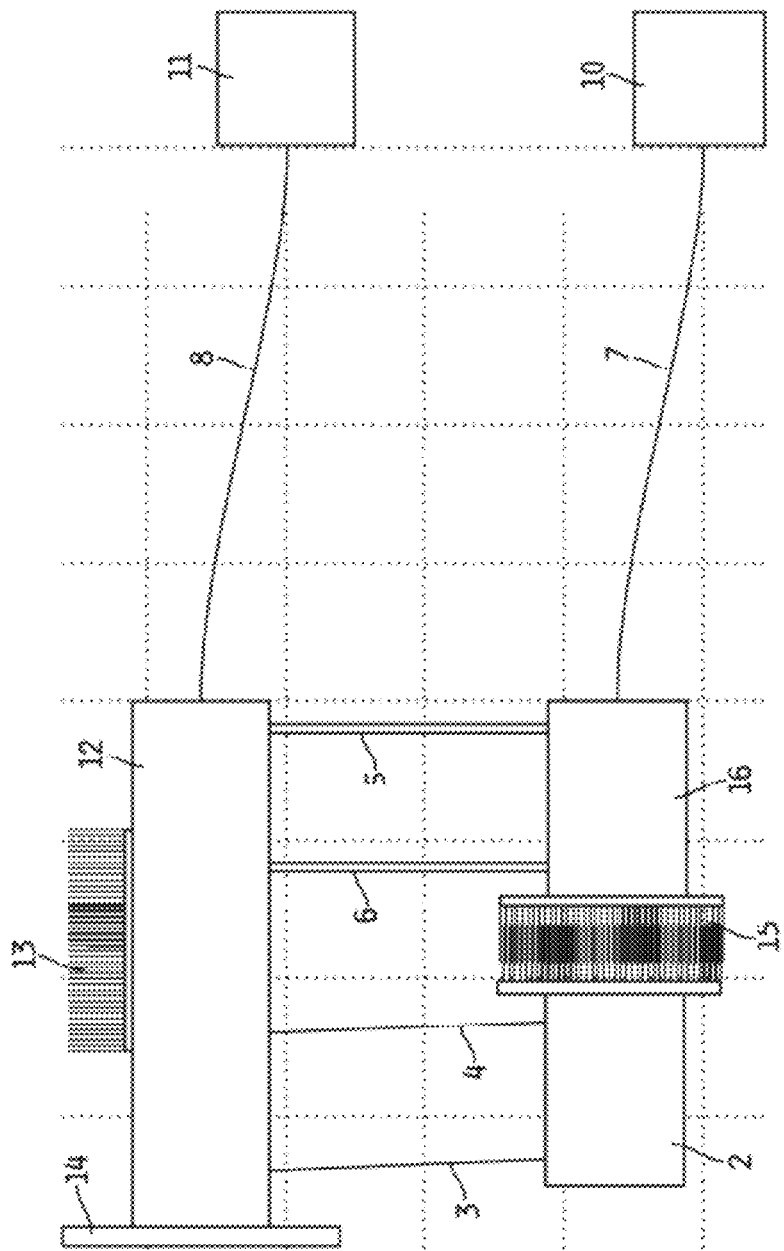
Figure 23:
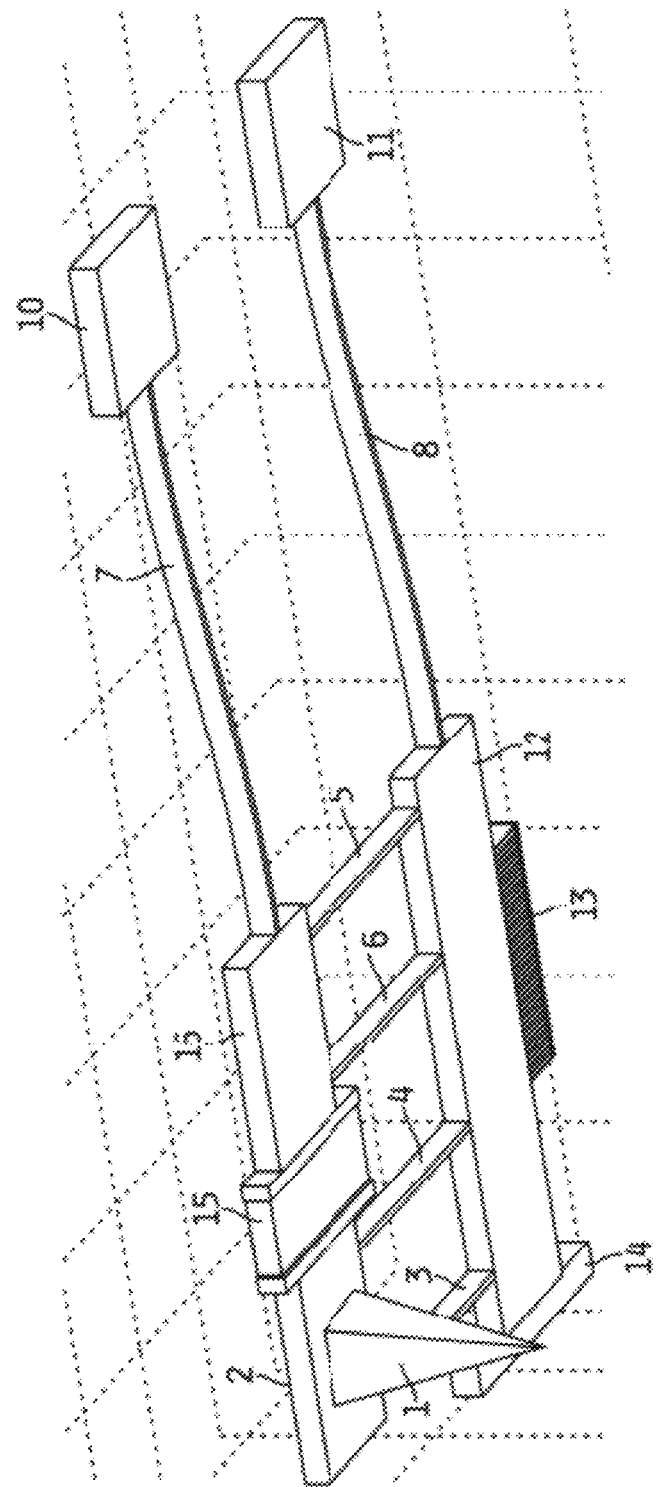

Quality Control for Batch Fabrication:

EMM may also used to increase the yield of batch fabrication. FIG. 19 illustrates a general process flow of an automatable fabrication process. For an automated example, upon fabrication a robotic may electronically probe the newly fabricated wafer for EMM properties. Such properties will be used as input to modeling parameters for experimentally-accurate simulation, which is used to test the performance. If the test is not passed, then the process flow may proceed to either modifying material properties such as temperature, concentration, and pressure, or modifying the geometrical layout for a subsequent run. In doing so, the yield is increased.

Data Storage:

The present device shown in FIGS. 20-23 discussed below, or other suitable EMM design, may also be used as a data storage device. That is, by operating over a deformable polymer surface, the device will be able to precisely position itself and create data bits in the form of dimples in the polymer. The size of the dimple will depend on the radius of the probe tip. For example, if data dots are placed 10 nm apart, the storage density would be over 6 terrabits per square inch. Conventional storage densities are on the order of 100 gigabits per square inch.

Biological Force-Displacement Probe:

Biological science is a large industry, and understanding biological phenomena has been quite allusive. Having new tools which can precisely manipulate and measure forces and displacements will lead to new theories, experiments, and exploitations for human benefit. For example, forces governing virus molecular motors, protein folding, associating physiological characteristics to genes, designer drugs, etc. The EMM design shown in FIGS. 20-23 discussed below or other suitable design, along with design modifications, may prove to be indispensable for enabling biological force-displacement tools.

Figure 24:
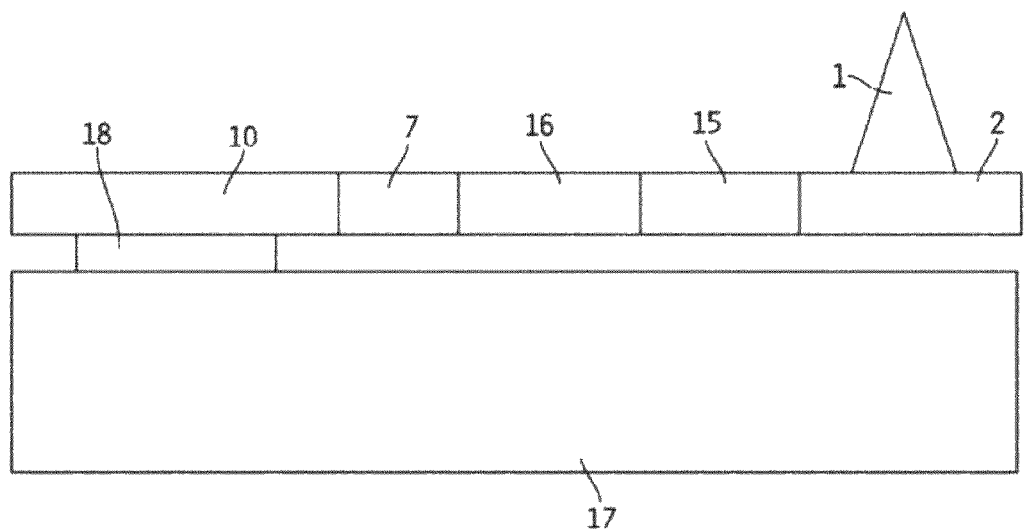

Referring to FIGS. 20-25, a general structure for nanoscale sensing and action with three degrees of freedom is illustrated. The anchors 10 and 11 and the moveable structure are shown. The material of the microstructure is conductive, such as doped silicon. The anchors 10 and 11 are generally fixed to the substrate 17 through an insulator, such as silicon dioxide 18 as best shown in FIG. 24. The probe tip 1 may be attached after the fabrication of the planar structure or directly fabricated onto the planar structure. Other applications may require a flat platform without the probe tip 1.

Three degrees of freedom are as follows. The two flexures 7 and 8 together with comb drive actuator 13 provide the first degree of freedom. The flexibility of the structure together with the electrostatic actuator 14 provides the second degree of freedom. The two flexures 3 and 4 together with comb drive 15 provide the third degree of freedom.

The monolithic comb drive: One of the novelties of the device is the monolithic comb drive 15, which is used for the third degree of freedom. An electric potential difference between the comb fingers of 15 is produced by applying an electric potential difference between the anchors 10 and 11. An electric current travels from 11 to 10. Since the semiconductor is resistive, a potential drop develop across the comb drive 15. Upon deflection of flexures 3 and 4, there is a change in capacitance in 15 that can be sensed through a capacitance meter connected to anchors 10 and 11. This change in capacitance is used to determine both deflection and force. By increasing the electric potential difference between anchors 10 and 11, the voltage will increase across the monolithic comb drive 15, which can be used to increase the applied comb drive force. Drives 13 and 15 deflect the AFM in-plane, while electrostatic actuator 14 deflects the AFM out of plane. The AFM may be used as a passive AFM to sense forces on or displacement of the probe tip 1. Alternatively, AFM may be used actively by driving drive actuator 15, comb drive 13 or electrostatic actuator 14 to move the probe tip 1 and apply forces with the probe tip 1.

The function of the two structures 5 and 6 is to produce a large potential difference between plates 12 and 16. The potential of plate 2 is about the same potential as plate 12. The potential of plate 16 is less than the potential of plate 12. See the finite element simulation in FIG. 25. Actuators 13 and 15 act like capacitors and flexures 3, 4, 7 and 8 and structures 7 and 8 act as resistors to effectively form an RC circuit.

Figure 25:
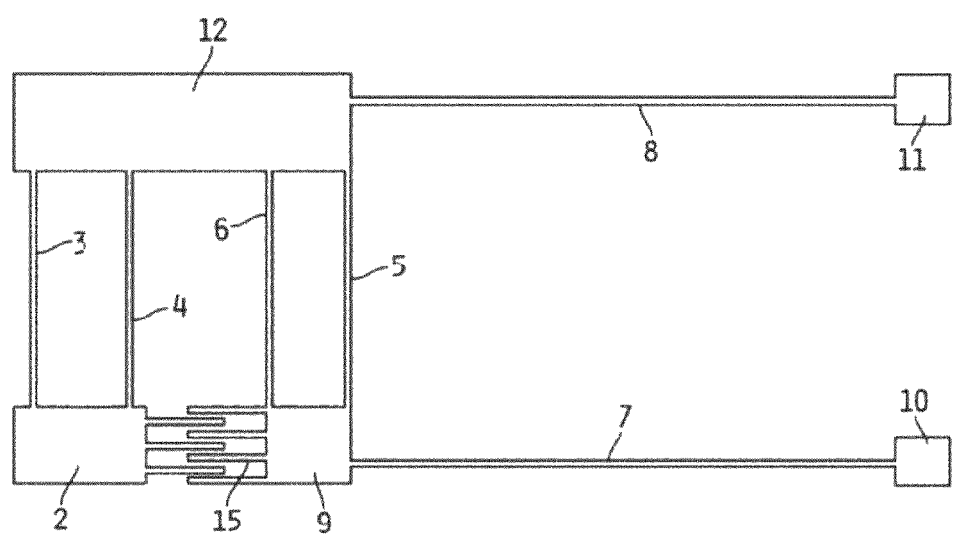

Fabrication: FIG. 25 shows a cross section of microfabrication processing, if silicon-on-insulator (SOI) processing is used. Given the topographical layout of the structure, the device may be fabricated by one of several available foundry services, such as MUMPs processes. Once the microdevice is fabricated, a probe tip 1 may be attached onto platform 2. Sensing and actuation electrodes may be wire bonded to anchors 10 and 11, the opposing electrode to comb drive 13, and the opposing electrode to 14. Once the sensing and actuation electronics are configured, the microdevice may flipped over, so that the probe tip is pointed downward, to function as a 3 degree of freedom atomic force microscope.

In contrast the conventional one degree of freedom atomic force microscope (AFM) with a range of about 5 microns; the present device has operates with 3 degrees of freedom and a much, much larger displacement range. The conventional AFM is generally a passive device; the present device may perform actively or passively. The conventional AFM uses light beam reflection to detect displacement; the present device uses capacitance for sensing applied force and displacement, and it used voltage for applying its own force. The conventional AFM is large in size, requiring the area of a desktop; the present device is the size of a small microchip. The conventional AFM operates in tapping mode with one degree of freedom; the present device may operate in tapping mode with 3 degrees of freedom.

While the invention has been illustrated and described in detail in the drawings and foregoing description, the description is to be considered as illustrative and not restrictive in character. Only the illustrated embodiments, and such alternative embodiments deemed helpful in further illuminating the illustrated embodiments, have been shown and described.

Although the invention has been described in detail with reference to certain illustrated embodiments, variations and modifications exist within the scope and spirit of the present invention as described and defined herein and in the following claims.

The invention claimed is:

1. A self-calibrating apparatus comprising:
   a primary device fabricated on an integrated circuit chip, the primary device having at least one unknown property due to a fabrication process of the integrated circuit chip;
   a test structure fabricated on the same integrated circuit chip as the primary device, the test structure having the same material properties as the primary device so that the test structure also has the same at least one unknown property as the primary device;
   an electrical measurand sensor configured to measure an electrical measurand of the test structure; and
   a controller coupled to the primary device and electrical measurand sensor, the controller including means for calculating a value indicative of the at least one unknown property of the test structure based on the measured electrical measurand, the controller using the calculated value indicative of the at least one unknown property to calibrate the primary device.

2. The apparatus of claim 1, wherein the electrical measurand sensor is fabricated on the same chip as the primary device and the test structure.

3. The apparatus of claim 2, wherein the controller is fabricated on the same chip as the primary device, the test structure, and the electrical measurand sensor.

4. The apparatus of claim 1, wherein the electrical measurand sensor is a capacitance sensor having at least an attofarad resolution.

5. The apparatus of claim 1, wherein the primary device is one of an atomic force microscope, a gravimeter, an AFM cantilever calibration device, a single strand DNA sequencer, a nanomanipulator, a quality control for a batch fabrication foundry, a self-calibrating chip, an altimeter, a strain sensor, a Casimir force sensor, and a biological force-displacement probe.

6. The apparatus of claim 1, wherein the test structure is a comb drive having an anchor, a guided plate, and first and second beams coupled between the anchor and the guided plate.

7. The apparatus of claim 1, wherein the at least one unknown property comprises at least one of Young's modulus, density, stress, stain gradient, a geometrical error, viscosity, and stiffness.

8. The apparatus of claim 1, wherein the primary device is an atomic force microscope.

9. The apparatus of claim 8, wherein the atomic force microscope has three degrees of freedom of movement comprising, the atomic force microscope comprising first and second anchors rigidly coupled to a substrate; first and second flexures coupled to the first and second anchors, respectively; a first plate coupled to the first flexure; a first drive actuator coupled to the first plate; an electrode coupled to the first plate; a second plate coupled to the first plate by a third flexure; a third plate coupled to the first plate by at least one structures, the third plate also being coupled to the second anchor by the second flexure; a second drive actuator located between the second and third plates; and a probe tip coupled to the second plate, wherein the first and second flexures and the first drive actuator provide a first degree of freedom, the electrode provides a second degree of freedom, and the third flexure and the second drive actuator provide a third degree of freedom.

10. The apparatus of claim 9, wherein an electric potential across the second drive actuator is produced by applying an electric potential difference between the first and second anchors.

11. The apparatus of 10, further comprising a capacitance meter coupled to the first and second anchors, the capacitance meter sensing change in capacitance caused by deflection of the third flexure upon engagement of the probe tip with a sample.

12. The apparatus of 11, wherein a change in capacitance measured by the capacitance meter is used to determine at least one of deflection of the probe tip and force applied to the probe tip.

13. A self-calibrating apparatus comprising:
a primary device fabricated on an integrated circuit chip, the primary device having at least one unknown property due to a fabrication process of the integrated circuit chip;
a test structure fabricated on the same integrated circuit chip as the primary device, the test structure having the same material properties as the primary device so that the test structure also has the same at least one unknown property as the primary device;
an electrical measurand sensor configured to measure an electrical measurand of the test structure; and
a controller coupled to the primary device and electrical measurand sensor, the controller being configured to calculate a value indicative of the at least one unknown property of the test structure based on the measured electrical measurand, the controller using the calculated value indicative of the at least one unknown property to calibrate the primary device.

14. The apparatus of claim 13, wherein the primary device is one of a force sensor and a displacement sensor.

15. The apparatus of claim 13, wherein the test structure is a sensor including at least one comb drive having an anchor, a guided plate, and first and second beams coupled between the anchor and the guided plate.

16. The apparatus of claim 13, wherein the at least one unknown property comprises at least one of Young's modulus, density, stress, stain gradient, a geometrical error, viscosity, and stiffness.

17. The apparatus of claim 13, wherein the unknown property is a difference between a layout of the sensor and an actual fabrication of the sensor on the integrated circuit chip.

18. The apparatus of claim 13, wherein the controller calibrates the primary device by determining actual widths, gaps and lengths of the fabricated primary device based on the at least one unknown property calculated using the at least one measured electrical measurand.

19. The apparatus of claim 13, wherein the electrical measurand is one of capacitance, voltage, and frequency.

20. The apparatus of claim 13, wherein the electrical measurand is capacitance and the electrical measurand sensor measures the capacitance with at least an attofarad resolution.

* * * * *